United States Patent
Rahman et al.

(10) Patent No.: US 7,313,755 B2
(45) Date of Patent: Dec. 25, 2007

(54) MEDIA TIMELINE SORTING

(75) Inventors: Shafiq Ur Rahman, Redmond, WA (US); Alexandre V. Grigorovitch, Redmond, WA (US); Xiqiang Daniel Zhi, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 331 days.

(21) Appl. No.: 11/110,295

(22) Filed: Apr. 20, 2005

(65) Prior Publication Data

US 2006/0242550 A1    Oct. 26, 2006

(51) Int. Cl.
G06F 15/00    (2006.01)

(52) U.S. Cl. ................................. 715/500.1

(58) Field of Classification Search ............ 715/500.1, 715/723
See application file for complete search history.

(56) References Cited

U.S. PATENT DOCUMENTS

| | | | |
|---|---|---|---|
| 5,973,679 A | | 10/1999 | Abbott et al. |
| 6,181,872 B1* | | 1/2001 | Yamane et al. ............. 386/112 |
| 2002/0194195 A1* | | 12/2002 | Fenton et al. ............ 707/104.1 |
| 2003/0009469 A1* | | 1/2003 | Platt et al. ................. 707/100 |
| 2004/0010593 A1* | | 1/2004 | Apostolopoulos et al. .. 709/226 |
| 2004/0143598 A1* | | 7/2004 | Drucker et al. .......... 707/104.1 |
| 2004/0172593 A1* | | 9/2004 | Wong et al. ................ 715/512 |
| 2004/0181747 A1* | | 9/2004 | Hull et al. ................ 715/500.1 |
| 2004/0264383 A1* | | 12/2004 | Rudolph et al. ............ 370/252 |
| 2005/0182503 A1* | | 8/2005 | Lin et al. ...................... 700/94 |
| 2005/0244005 A1* | | 11/2005 | Grigorovitch et al. ...... 380/205 |
| 2005/0289151 A1* | | 12/2005 | Burke ........................ 707/100 |
| 2006/0075346 A1* | | 4/2006 | Lanning et al. ............. 715/723 |
| 2006/0092295 A1* | | 5/2006 | Mercer ....................... 348/239 |
| 2006/0282776 A1* | | 12/2006 | Farmer et al. ............. 715/719 |
| 2007/0101271 A1* | | 5/2007 | Hua et al. ................... 715/731 |

OTHER PUBLICATIONS

Schmandt, Audio Hallway: a Virtual Acoustic Environment for Browsing, ACM 1998, pp. 163-170.*
Shipman et al., Generation of Interactive Multi-Level Video Summaries, ACM 2003, pp. 392-401.*

* cited by examiner

Primary Examiner—Cong-Lac Huynh
(74) Attorney, Agent, or Firm—Lee and Hayes, PLLC

(57) ABSTRACT

Media timeline sorting is described. In an implementation, a method includes receiving a media timeline at an application programming interface, in which, the media timeline includes a plurality of timeline objects. One or more of the timeline objects reference a respective one of a plurality of media. A plurality of segments is generated from the media timeline for sequential rendering such that each segment references a particular set of the timeline objects that are rendering during a duration of the segment.

19 Claims, 24 Drawing Sheets

MEDIA TIMELINE SORTING

TECHNICAL FIELD

The present invention generally relates to media, and more particularly relates to media timeline sorting.

BACKGROUND

Users of computers, such as desktop PCs, set-top boxes, personal digital assistants (PDAs), and so on, have access to an ever increasing amount of media from an ever increasing variety of sources. For example, a user may interact with a desktop PC that executes a plurality of applications to provide media for output, such as home videos, songs, slideshow presentations, and so on. The user may also utilize a set-top box to receive traditional television programming that is broadcast to the set-top box over a broadcast network. Additionally, the set-top box may be configured as a personal video recorder (PVR) such that the user may store the broadcast content in memory on the set-top box for later playback. Further, the user may interact with a wireless phone that executes a plurality of applications such that the user may read and send email, play video games, view spreadsheets, and so forth.

Because of the wide variety of media sources and the wide variety of computers that may be utilized to provide and interact with media, traditional applications and computers were often configured to specifically address each particular type of media. For example, applications that were executed on a video-game console to output video-games were typically configured to provide an output of the applications to a television, and were not configured to provide the output that could be utilized by other computers and other devices. Therefore, presentation of content that was provided by the different media sources, such as computers and/or applications, may involve multiple applications and devices which may be both time and device intensive. Additionally, multiple applications that were executed on the same computer may be configured to specifically address the particular type of media provided by each respective application. For instance, a first audio playback application may be configured to output media configured as songs. A second audio playback application, however, may be configured to record and playback the recordings in an audio format that is not compatible with the first audio playback application, such as an audio-dictation format. Thus, even applications that are configured for execution on the same computer and the same type of media, e.g. audio, may provide media that is incompatible, one to another.

A timeline provides a way for a user to define a presentation of media. For example, a media player can play a list of songs, which is commonly referred to as a "playlist". Traditional timelines, however, were limited by the wide variety of media sources and the wide variety of computer configurations that may be utilized to provide and interact with media. When desiring the output of media from different applications, for instance, each type of media may require a different timeline which involves the use of different applications. This may result in an inefficient use of both hardware and software resources of the computer. Additionally, the different timelines may make it difficult to coordinate the outputs from the respective timelines, such as to output media from the separate timelines concurrently.

Further, the execution of large timelines may result in the inefficient use of software and/or hardware resources of the computer. When loading a large playlist of songs, for instance, each song in the playlist was loaded. Therefore, the initial loading of the playlist may consume a significant amount of hardware and/or software resources, thereby resulting in a delay in the loading and playing of songs in the playlist.

Accordingly, there is a continuing need to provide an improved timelines and techniques for sorting timelines to determine how to render the timeline.

SUMMARY

Sorting a media timeline is described. The media timeline provides a technique for a user to define a presentation based on media. The media timeline may be utilized to express groupings and/or combinations of media and provide compositional metadata utilized by a timeline source to provide a presentation of the media described by the media timeline. The media timeline may be configured in a variety of ways to address a variety of considerations.

A timeline sorter is also described which is executable to divide the media timeline into a plurality of segments. In an implementation, a method includes receiving a media timeline at an application programming interface, in which, the media timeline includes a plurality of timeline object. One or more of the timeline objects reference a respective one of a plurality of media. A plurality of segments is generated from the media timeline for sequential rendering such that each segment references a particular set of the timeline objects that are rendering during a duration of the segment.

BRIEF DESCRIPTION OF THE DRAWINGS

The same numbers are used throughout the disclosure and figures to reference like components and features.

DETAILED DESCRIPTION

Overview

Media timeline sorting is described. A media timeline provides a technique for a user to define a presentation based on media, such as already existing media (e.g., stored media such as video, songs, documents, and so on) and/or media that is output in "real-time" from a media source, such as streaming audio and/or video. The media timeline may be utilized to express groupings and/or combinations of media and provide compositional metadata utilized by a timeline source that executes, e.g. renders, the media timeline to provide a final presentation which includes the media described by the media timeline.

In an implementation, the media timeline is configured for dynamic creation and/or loading of the media timeline. As previously discussed, a large media timeline, e.g. media timelines having a considerable number of nodes and/or significant amount of data, may result in inefficiencies when the media timeline is loaded. For example, a computer that loads the media timeline may utilize significant processing and memory resources even if all the nodes of the media timeline are not output at that time. Therefore, the media timeline may be configured for dynamic creation and/or loading such that the media timeline, when rendered, may intelligently delay loading and/or creation of the nodes of the media time. By configuring the media timeline for dynamic loading and creation, hardware and/or software resources of the computer may be efficiently utilized during startup of the computer and for loading the media timelines in general.

For example, a timeline sorter may be executed to convert a media timeline described by a timeline object model into a sequence of segments which can be independently rendered using a media processing pipeline. In an implementation, the timeline sorter can determine segments "on the fly", such that the timeline sorter does not need the entire presentation to be defined "up front". For instance, each segment may be rendered as an independent piece in a media processing pipeline such that the entire presentation is not defined upfront as a single entity. Therefore, changes may be made to the media timeline without having to "tear down" media pipeline which is used to render the media timeline should some portion of the media timeline change, such as updated and so on. Further discussion of media timelines that provide for dynamic creation and/or loading of the nodes of the media timeline may be found in relation to FIGS. 12-27.

In the following discussion, an exemplary environment is first described which is operable to employ the media timeline sorting techniques. Exemplary procedures are then described which are operable in the exemplary environment, as well as in other environments.

Exemplary Environment

Figure 1:
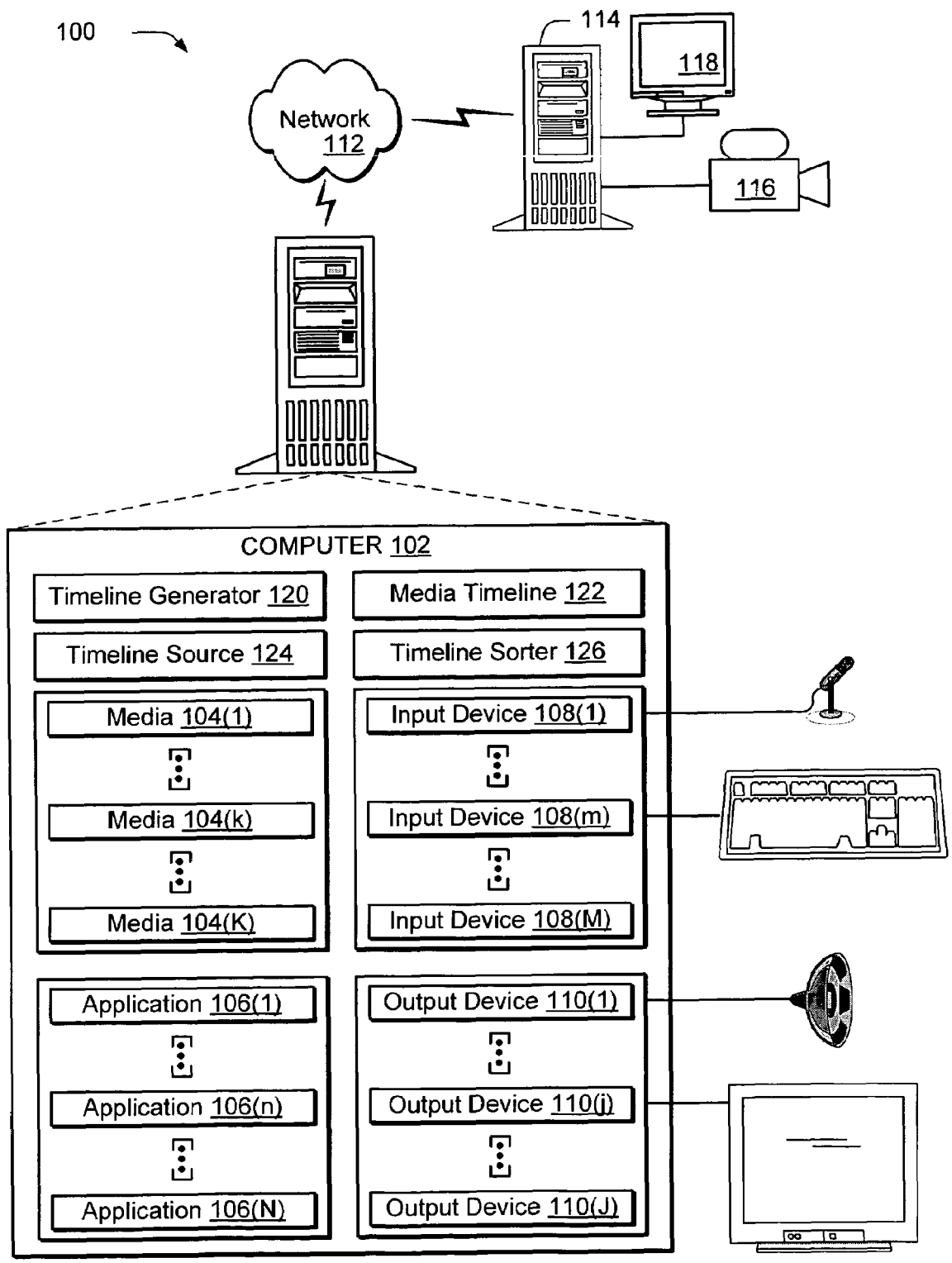
FIG. 1 is an illustration of an environment in an exemplary implementation in which a computer provides access to a plurality of media.

FIG. 1 is an illustration of an environment 100 in an exemplary implementation in which a computer 102 provides access to a plurality of media. The computer 102, as illustrated, is configured as a personal computer (PC). The computer 102 may also assume a variety of other configurations, such as a mobile station, an entertainment appliance, a set-top box communicatively coupled to a display device, a wireless phone, a video game console, a personal digital assistant (PDA), and so forth. Thus, the computer 102 may range from a full resource device with substantial memory and processor resources (e.g., PCs, television recorders equipped with hard disk) to a low-resource device with limited memory and/or processing resources (e.g., a traditional set-top box). An additional implementation of the computer 102 is described in relation to FIG. 28.

The computer 102 may obtain a variety of media from a variety of media sources. For example, the computer 102 may locally store a plurality of media 104(1), . . . , 104(k), . . . , 104(K). The plurality of media 104(1)-104(K) may include an assortment of audio and video content having various formats, such as WMV, WMA, MPEG 1, MPEG 2, MP3, and so on. Further, the media 104(1)-104(K) may be obtained from a variety of sources, such as from an input device, from execution of an application, and so on.

The computer 102, for instance, may include a plurality of applications 106(1), . . . , 106(n), . . . , 106(N). One or more of the plurality of applications 106(1)-106(N) may be executed to provide media, such as documents, spreadsheets, video, audio, and so on. Additionally, one or more of the plurality of applications 106(1)-106(N) may be configured to provide media interaction, such as encoding, editing, and/or playback of the media 104(1)-104(K).

The computer 102 may also include a plurality of input devices 108(1), . . . , 108(m), . . . , 108(M). One or more of the plurality of input devices 108(1)-108(M) may be configured to provide media for input to the computer 102. Input device 108(1), for instance, is illustrated as a microphone that is configured to provide an input of audio data, such as a voice of the user, a song at a concert, and so on. The plurality of input devices 108(1)-108(M) may also be configured for interaction by a user to provide inputs that control execution of the plurality of applications 106(1)-106(N). For example, input device 108(1) may be utilized to input voice commands from the user, such as to initiate execution of a particular one of the plurality of applications 106(1)-106(N), control execution of the plurality of applications 106(1)-106(N), and so forth. In another example, input device 108(m) is illustrated as a keyboard that is configured to provide inputs to control the computer 102, such as to adjust the settings of the computer 102.

Further, the computer 102 may include a plurality of output devices 110(1), . . . , 110(j), . . . , 110(J). The output devices 110(1)-110(J) may be configured to render media 104(1)-104(K) for output to the user. For instance, output device 110(1) is illustrated as a speaker for rendering audio data. Output device 110(j) is illustrated as a display device, such as a television, that is configured to render audio and/or video data. Thus, one or more of the plurality of media 104(1)-104(K) may be provided by the input devices 108(1)-108(M) and stored locally by the computer 102. Although the plurality of input and output devices 108(1)-108(M), 110(1)-110(J) are illustrated separately, one or more of the input and output devices 108(1)-108(M), 110(1)-110(J) may be combined into a single device, such as a television having buttons for input, a display device, and a speaker.

The computer 102 may also be configured to communicate over a network 112 to obtain media that is available remotely over the network 112. The network 112 is illustrated as the Internet, and may include a variety of other networks, such as an intranet, a wired or wireless telephone network, a broadcast network, and other wide area networks. A remote computer 114 is communicatively coupled to the network 112 such that the remote computer 114 may provide media to the computer 102. For example, the remote computer 114 may include one or more applications and a video camera 116 that provides media, such as home movies. The remote computer 114 may also include an output device to output media, such as the display device 118 as illustrated. The media obtained by the computer 102 from the remote computer 114 over the network 112 may be stored locally with the media 104(1)-104(K). In other words, media 104(1)-104(K) may include locally stored copies of media obtained from the remote computer 114 over the network 112.

Thus, the computer 102 may obtain and store a plurality of media 104(1)-104(K) that may be provided both locally (e.g., through execution of the plurality of applications 106(1)-106(N) and/or use of the plurality of input device 108(1)-108(M)), and remotely from the remote computer 114 (e.g., through execution of application and/or use of input devices). Although the plurality of media 104(1)-104(K) has been described as stored on the computer 102, the media 104(1)-104(K) may also be provided in "real-time". For example, audio data may be streamed from the input device 108(1), which is illustrated as a microphone, without storing the audio data.

The computer 102 includes a timeline generator 120 that, when executed on the computer 102, generates a media timeline 122. For example, the timeline generator 120 may be configured as an application that exposes one or more software components that may be used to generate the media timeline 122, such as through a user interface by a user. As previously described, the media timeline 122 provides a technique for a user to define a presentation of stored and/or real-time media from the plurality of media sources. For example, the media timeline 122 may describe a collection of media that was obtained from the input devices 108(1)-108(M), the applications 106(1)-106(N), and/or the remote computer 114. The user may utilize one or more of the input devices 108(1)-108(M) to interact with the timeline generator 120 to define groupings and/or combinations of the media 104(1)-104(K). The user may also define an order and effects for presentation of the media 104(1)-104(K). A timeline source 124 may then be executed on the computer 102 to render the media timeline 122. The media timeline 122, when rendered, provides the expressed groupings and/or combinations of the media 104(1)-104(K) for rendering by one or more of the plurality of output devices 110(1)-100(J). Additionally, the timeline generator 120 may also programmatically generate the media timeline 122 as is described in greater detail in the following implementation.

To determine the expressed groupings, the computer 102 also includes a timeline sorter 126. The timeline sorter 126 is executable to divide the media timeline into a plurality of segments in which each segment includes a set of timeline objects to be rendered during that segment which do not change. Further discussion of execution of the timeline sorter 126 may be found in relation to FIGS. 12-27.

Figure 2:
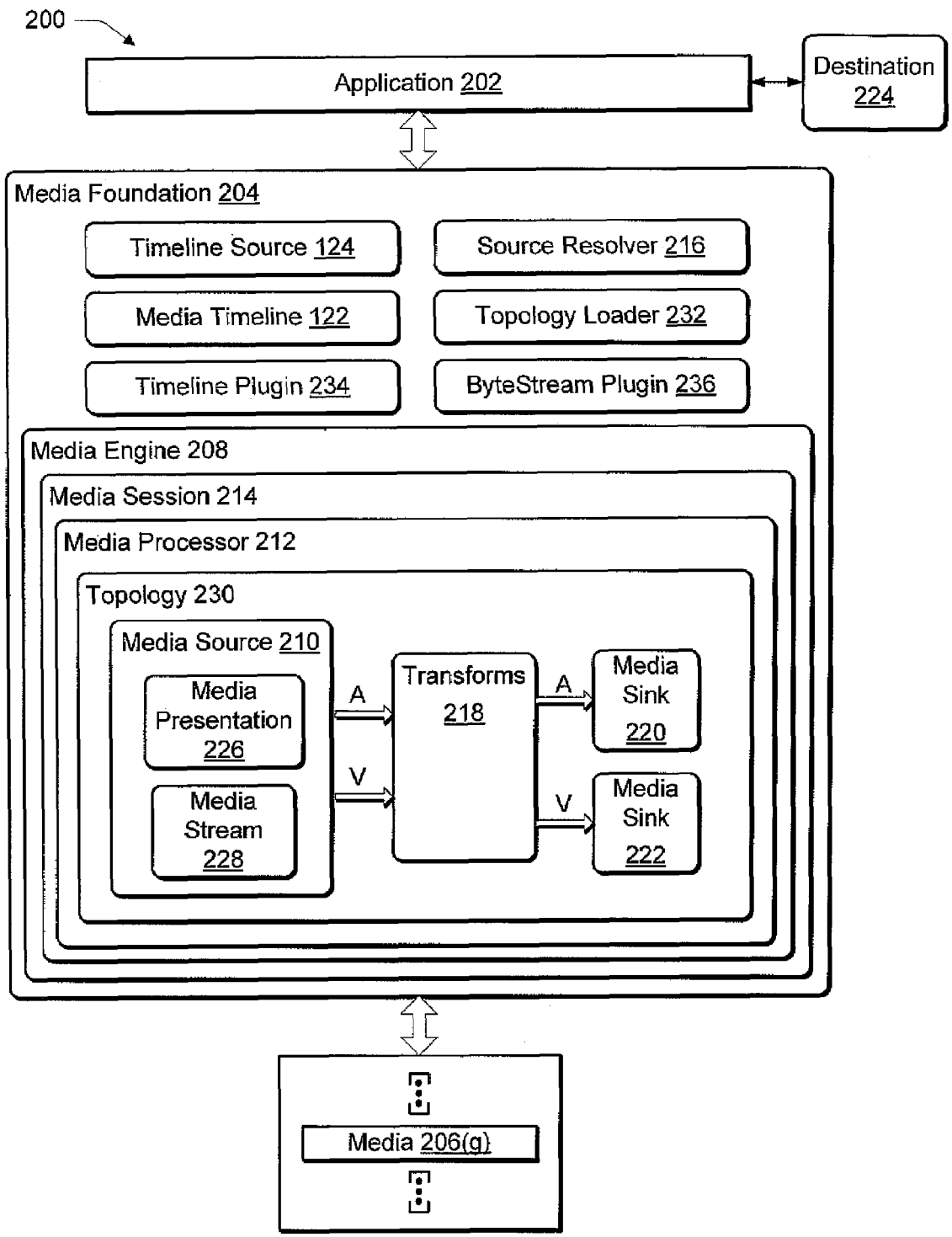
FIG. 2 is a high level block diagram of a system in an exemplary implementation in which the system, implemented in software, includes an application that interacts with a media foundation to control presentation of a plurality of media.

FIG. 2 is a high level block diagram of a system 200 in an exemplary implementation in which the system 200, implemented in software, includes an application 202 that interacts with a media foundation 204 to control presentation of a plurality of media 206(g), where "g" can be any number from one to "G". The media foundation 204 may be included as a part of an operating system to provide playback of the media 206(g) such that applications that interact with the operating system may control playback of the media 206(g) without "knowing" the particular details of the media formats. The media 206(g) may be provided from a variety of sources, such as from the media 104(1)-104(K) of FIG. 1, through execution of the applications 106(1)-106(N), use of the input devices 108(1)-108(M), output devices 110(1)-110(J), and so on.

The application 202, which may be the same as or different from applications 106(1)-106(N) of FIG. 1, interacts with a media engine 208 to control the media 104(1)-104(K). In at least some embodiments, the media engine 208 serves as a central focal point of the application 202 that desires to somehow participate in a presentation. A presentation, as used in this document, refers to or describes the handling of media. In the illustrated and described embodiment, a presentation is used to describe the format of the data on which the media engine 208 is to perform an operation. Thus, a presentation can result in visually and/or audibly presenting media, such as a multimedia presentation in which both audio and accompanying video is presented to user within a window rendered on a display device, such as output device 110(j) of FIG. 1 that is illustrated as a display device that may be associated with a desktop PC. A presentation can also result in writing media content to a computer-readable medium such as a disk file. Thus, a presentation is not limited to scenarios in which multimedia content is rendered on a computer. In some embodiments, operations such as decoding, encoding and various transforms (such as transitions, effects and the like), can take place as a result of a presentation.

In an embodiment, the media foundation 204 exposes one or more application program interfaces that can be called by the application 202 to interact with the media 206(g). For example, the media foundation 204 may be thought of as existing at an "infrastructure" level of software that is executed on the computer 102 of FIG. 1. In other words, the media foundation 204 is a software layer used by the application 202 to interact with the media 206(g). The media foundation 204 may be utilized to control a number of aspects of the media 206(g), such as output, rendering, storage, and so on. Thus, the media foundation 204 may be utilized such that each application 202 does not have to implement separate code for each type of media 206(g) that may be used in the system 200. In this way, the media foundation 204 provides a set of reusable software components to do media specific tasks.

The media foundation 202 may utilize several components among which include the media timeline 122, the timeline source 124, a media source 210, a media processor 212, a media session 214, the media engine 208, a source resolver 216, one or more transforms 218, one or more media sinks 220, 222, and so on. One advantage of various illustrated and described embodiments is that the system 200 is a pluggable model in the sense that a variety of different kinds of components can be utilized in connection with the systems described herein. Also included as a part of system 200 is a destination 224, which is discussed in more detail below. In at least one embodiment, however, the destination 224 is an object that defines where a presentation is to be presented (e.g. a window, disk file, and the like) and what happens to the presentation. That is, the destination may correspond to one or more of the media sinks 220, 222 into which data flows.

The media timeline 122 employs a timeline object model which provides a way for a user to define a presentation based on media that is rendered by the timeline source 124. The media timeline 122 may range from a sequential list of media files to more complex forms. For example, the media timeline 122 may employ file structures, such as SMIL and AAF, to express media playback experiences that include transitions between media, effects, and so on. The application 202, for instance, may be configured as a media player that can play a list of songs, which is commonly referred to as a playlist. As another example, in an editing system a user may overlay one video over the other, clip a media, add effect to the media and so forth. Such groupings or combinations of media may be expressed using the media timeline 122. Further discussion of the media timeline 122 is found in relation to FIG. 3.

The media source 210 is utilized to abstract a provider of media. The media source 210, for instance, may be configured to read a particular type of media from a particular source. For example, one type of media source might capture video from the outside world (e.g., a camera), and another might capture audio (e.g., a microphone). Alternately or additionally, the media source 210 may read a compressed data stream from disk and separate the data stream into its compressed video and compressed audio components. Yet another media source 210 might obtain data from the network 112 of FIG. 1. Thus, the media source 210 may be utilized to provide a consistent interface to acquire media.

The media source 210 provides one or more media presentation 226 objects (media presentation). The media presentation 226 abstracts a description of a related set of media streams. For example, the media presentation 226 may provide a paired audio and video stream for a movie. Additionally, the media presentation 226 may describe the configuration of the media source 210 at a given point in time. The media presentation 226, for instance, may contain information about the media source 210 including descriptions of the available streams of the media source 210 and their media types, e.g. audio, video, MPEG, and so on.

The media source 210 may also provide a media stream 228 object (media stream) which may represent a single stream from the media source 210 which can be accessed by the application 202, i.e. exposed to the application 202. The media stream 228 thus allows the application 202 to retrieve samples of the media 206(g). In an implementation, the media stream 228 is configured to provide a single media type. A media source can provide more than one media stream. For example, a wmv file can have both audio and video in the same file. The media source for this file will therefore provide two streams, one for audio and the other for video.

In the media foundation 204, therefore, the media source 210 is defined as a software component which outputs samples for a presentation. The timeline source 124 interprets the media timeline 122, but at the same time, may also act in a manner similar to the media source 210. For example, the timeline source 210 may be utilized to hide the intricacies of rendering the media timeline 122 to provide media described by the media timeline 122 from other components of the media foundation 204.

The media processor 212 manages data flow in a topology 230. The topology 230 defines how data flows through various components for a given presentation. A "full" topology includes each of the components, e.g. software modules, used to manipulate the data such that the data flows with the correct format conversions between different components. When a topology is created, the user might choose to create it partially. This partial topology is not sufficient, by itself, to provide a final presentation. Therefore, a component called the topology loader 232 may take the partial topology and convert it into a full topology by adding the appropriate data conversion transforms between the components in the partial topology.

In the topology 230, for example, data generally originates at the media source 210, flows through one or more transforms 218, and proceeds into one or more media sinks 220, 222. Transforms 218 can include any suitable data handling components that are typically used in presentations. Such components can include those that uncompress compressed data and/or operate on data in some way, such as by imparting an effect to the data, as will be appreciated by the skilled artisan. For example, for video data, transforms can include those that affect brightness, color conversion, and resizing. For audio data, transforms can include those that affect reverberation and re-sampling. Additionally, decoding and encoding can be considered as transforms.

Media sinks 220, 222 are typically associated with a particular type of media content. Thus, audio content might have an associated audio sink such as an audio renderer. Likewise, video content might have an associated video sink such as a video renderer. Additional media sinks can send data to such things as computer-readable media, e.g. a disk file and the like, stream the data over the network, such as broadcasting a radio program, and so on.

The media session 214 is a component which may schedule multiple presentations. Therefore, the media processor 212 may be used to drive a given presentation, and the media session 214 utilized to schedule multiple presentations. The media session 214, for instance, may change topologies that are rendered by the media processor 212. For example, the media session 214 may change from a first topology that is rendered on the media processor 212 to a second topology such that there is no gap between the renderings of samples from the consecutive presentations that are described by the respective topologies. Thus, the media session 214 may provide a seamless user experience as the playback of the media moves from one presentation to another.

The source resolver 216 component may be utilized to create a media source 210 from URLs and/or byte stream objects. The source resolver 216 may provide both synchronous and asynchronous ways of creating the media source 210 without requiring prior knowledge about the form of data produced by the specified resource.

In at least one embodiment, the media foundation 204 is utilized to abstract away the specific details of the existence of and interactions between various components of the media foundation 204. That is, in some embodiments, the components that are seen to reside inside the media foundation 204 are not visible, in a programmatic sense, to the application 202. This permits the media foundation 204 to execute so-called "black box" sessions. For example, the media engine 208 can interact with the media session 214 by providing the media session certain data, such as information associated with the media (e.g. a URL) and the destination 224, and can forward the application's 202 commands (e.g. open, start, stop and the like) to the media session 214. The media session 214 then takes the provided information and creates an appropriate presentation using the appropriate destination.

The media foundation 204 may also include a timeline plugin 234. The timeline plugin 234 may be utilized such that different media timeline file formats may be "plugged-in" to the media foundation 204. For example, a bytestream plugin 236 may be written for a format in question and registered with the media foundation 204. The source resolver 216 may then invoke a bytestream plugin 236 when a file of that type is opened. In turn the bytestream plugin 236 can parse the file, create a media timeline 122 representing the presentation described in the file, and create a timeline source 124 for it. In general, the bytestream plugin 236 is responsible for reading the raw bytestream and creating a media source 208 for it. In an implementation, the remaining components of media foundation 204 are not made aware that the media source created in this instance is a timeline source 124. Therefore, the timeline source 124 is treated like any other media source 208. In an implementation, a bytestream plugin 236 that can parse a media timeline 122 and create a timeline source 124 is referred to as a timeline plugin, which is described in greater detail in relation to FIG. 23.

The timeline plugin 234 may also provide an interface such that the application 202 may interact with the timeline plugin directly, such as to load and save the media timeline 122 from or to a file. For example, the timeline plugin 234 may be created and then called to initiate a load function to provide a bytestream. The timeline plugin 234 may then parse the file and create a root node and any additional nodes to create the media timeline 122, which will be described in greater detail in relation to FIG. 3. The timeline plugin 234 may also be used to persist the media timeline 122 to different formats. For example, the application 202 may create the media timeline 122 programmatically. In other words, the application may act as the timeline generator 120 of FIG. 1. The application 202 may then create a timeline plugin for ASX files, and ask the timeline plugin to save the media timeline 122 in the ASX format. In another example, a user can open an m3u file, i.e. a playlist file format for specifying multiple MP3 files, get the media timeline 122 from it, and then ask the timeline plugin to save the media timeline 122 in the ASX format. In this example, the timeline plugin acts as the timeline generator 120. Thus, the media foundation 204 may expose a plurality of software components that provide media functionality over an application programming interface for use by the application 202.

Figure 3:
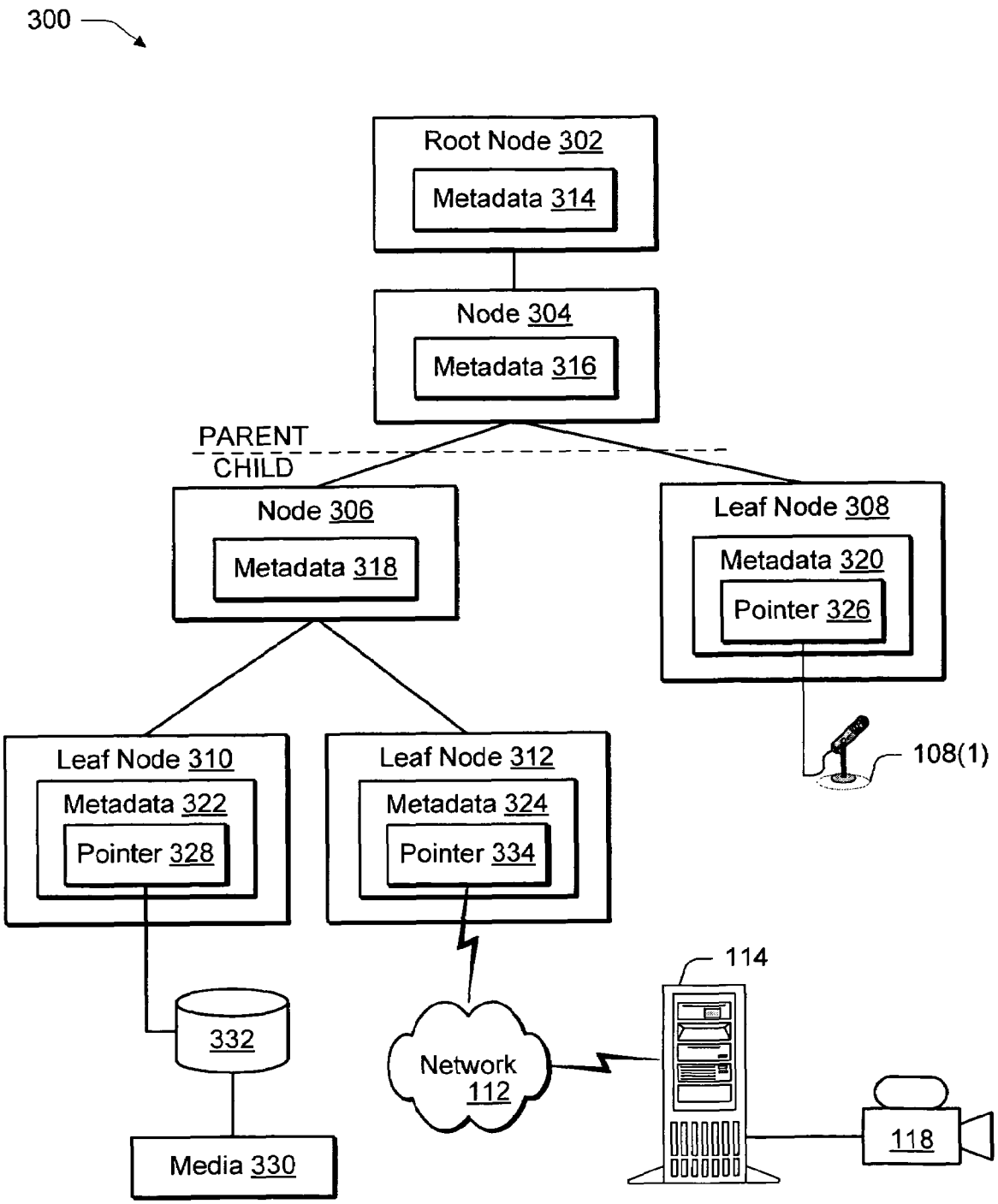
FIG. 3 is an illustration of an exemplary implementation in which a media timeline is shown as a tree that includes a plurality of nodes that provide for an output of media for a presentation.

FIG. 3 is an illustration of an exemplary implementation in which a media timeline 300 is shown as a tree that includes a plurality of nodes that describe an output of media for a presentation. The media timeline 300, which may or may not correspond to the media timeline 122 of FIGS. 1 and 2, is structured as a tree that includes a plurality of nodes 302-312. Each of the plurality of nodes 302-312 includes respective metadata 314-322 that describes various attributes and behaviors for the node and/or "children" of that particular node. For example, node 304 and node 306 are arranged, respectively, as a "parent" and "child". Node 304 includes metadata 316 that describes behaviors and attributes of that node 304. The metadata 316 may also describe each of the "child" nodes 306, 308, such as a rendering order of the nodes 306, 308.

In an implementation, the media timeline 300 is not executable by itself to make decisions about a user interface (UI), playback or editing. Instead, the metadata 314-324 on the media timeline 300 is interpreted by a software and/or hardware component that renders the media timeline 300, such as the timeline source 124 of FIG. 2. Additionally, applications that are utilized during rendering of the media timeline 122 may obtain relevant metadata for that particular application. For example, the application 202 of FIG. 2 may be configured as a playback engine that is only interested in the times at which each media referenced in the media timeline is to be started. On the other hand, another application, such as a media player, may be interested in just displaying the titles of the songs, which are stored as metadata on each node. In this way, the metadata may be utilized at the same time by one or more applications that utilize an output of the media.

The nodes 302-312, as positioned on the media timeline 300, describe a basic layout of the media timeline 300. This layout may be utilized for displaying a timeline structure in a user interface, utilized by the timeline source 124 of FIG. 2 to order rendering of the nodes, and so forth. For instance, various types of nodes 302-312 may be provided such that a desired layout is achieved. The node type indicates how the children of that node are interpreted, such as a root node 302 and leaf nodes 308-312. The root node 302 specifies a starting point for rendering the metadata timeline 300 and includes metadata 314 that describes how rendering is to be initiated.

In the illustrated implementation of FIG. 3, the leaf nodes 308, 310, 312 of the media timeline 122 directly map to media. For example, the leaf nodes 308, 310, 312 may have respective metadata 320, 322, 324 that describes how to retrieve the media that each of the leaf nodes 308-312 represent. A leaf node may specify a path for an audio and/or video file, point to a component which generates video frames programmatically during rendering of the media timeline 300, and so on. Leaf node 308, for instance, includes metadata 320 having a pointer 326 that maps to input device 108(1) that is configured as a microphone. Leaf node 310 includes metadata 322 having a pointer 328 that maps to an address of the media 330 in a storage device 332 that is included locally on the computer 102 of FIG. 1. Leaf node 312 includes metadata 324 having a pointer 334 that maps to a network address of the remote computer 114 on the network 112. The remote computer 114 includes the video camera 116 to provide media over the network 112 to the computer 102 of FIG. 1. Thus, in this implementation, the timeline 300 does not include the actual media, but rather references the media by using pointers 326, 328, 334 that describe where and/or how to locate the referenced media.

Figure 4:
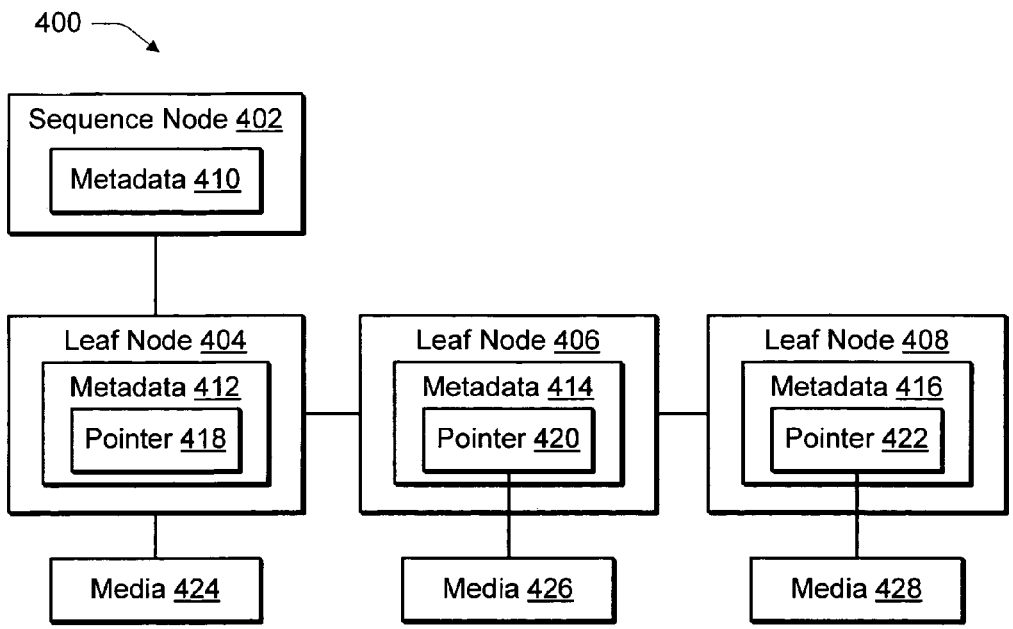
FIG. 4 is an illustration of an exemplary implementation showing a sequence node and a plurality of leaf nodes that are children of the sequence node.
Figure 5:
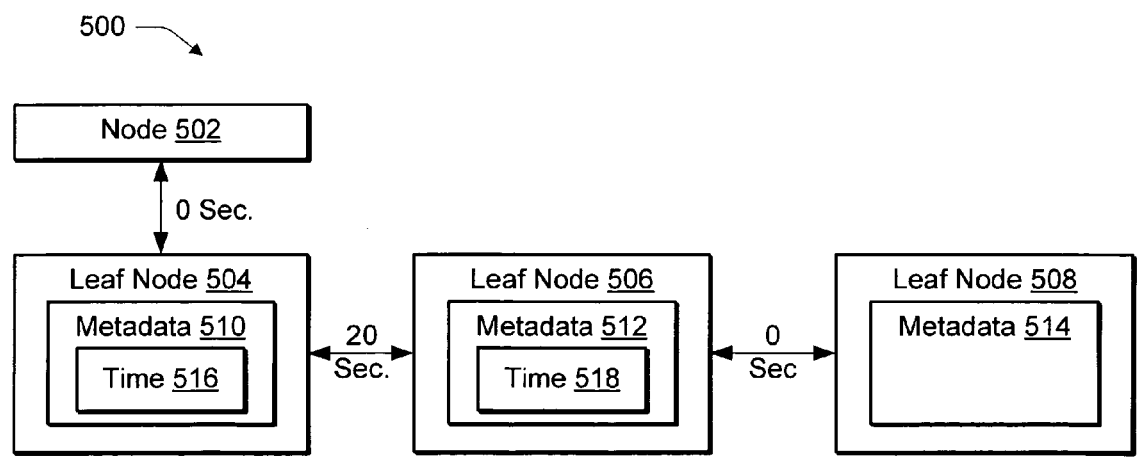
FIG. 5 is an illustration of an exemplary implementation in which a sequence node and a plurality of nodes that are children of the sequence node include metadata that specifies timing information for execution of the respective plurality of nodes.
Figure 6:
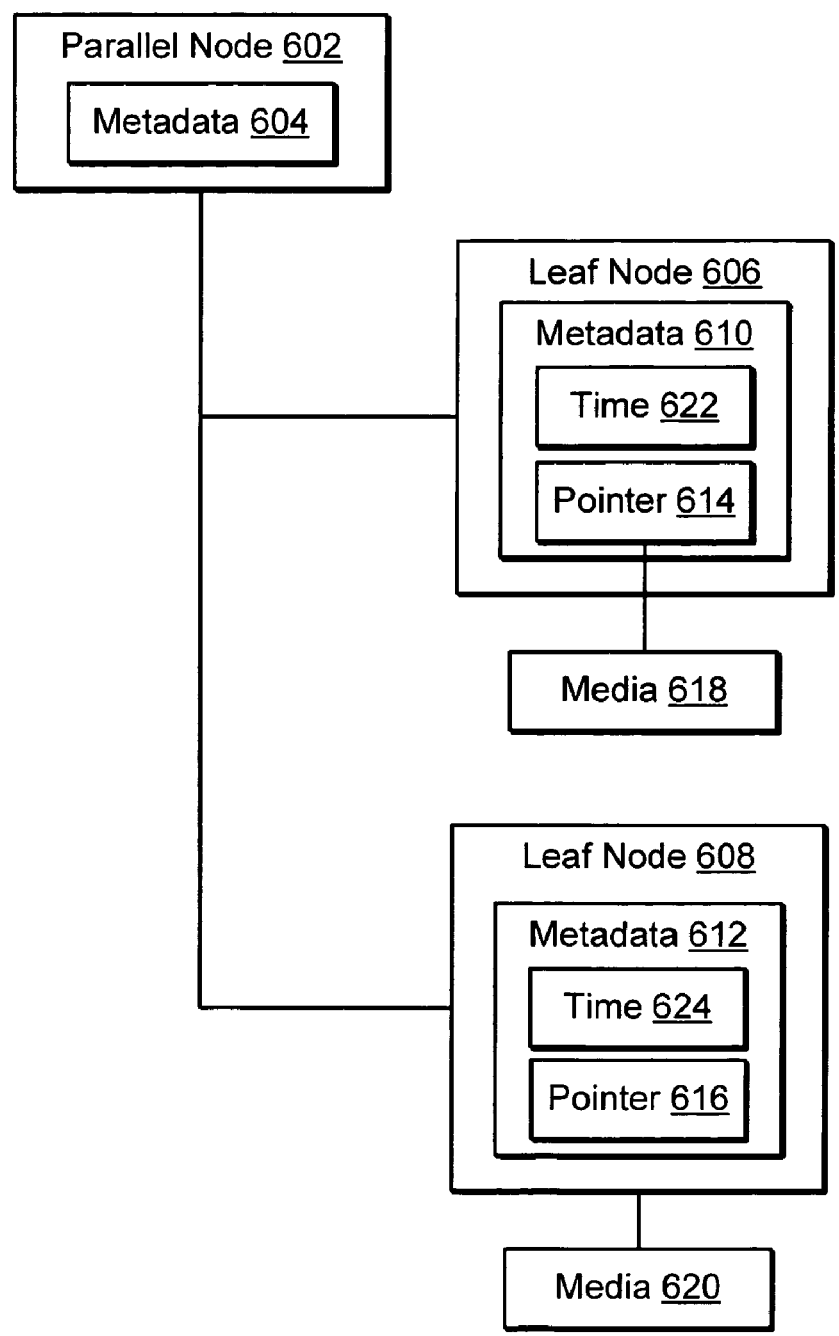
FIG. 6 is an illustration of an exemplary implementation showing a parallel node and a plurality of leaf nodes that are children of the parallel node.

Nodes 304, 306 may also describe additional nodes of the media timeline 300. For example, node 304 may be utilized to describe the order of execution for nodes 306, 308. In other words, node 304 acts as a "junction-type" node to provide ordering and further description of its "children". There are a variety of junction-type nodes that may be utilized in the media timeline 300, such as a sequence node and a parallel node. FIGS. 4-6 describe exemplary semantics behind the sequence and parallel nodes.

FIG. 4 is an illustration of an exemplary implementation 400 in which a sequence node 402 and a plurality of leaf nodes 404, 406, 408 that are children of the sequence node 402 are shown. The children of the sequence node 402 are rendered one after the other. Additionally, the sequence node 402 may include metadata 410 that describes a rendering order of the plurality of leaf nodes 404-408. As illustrated, leaf node 404 is rendered first, followed by leaf node 406, which is followed by leaf node 408. Each leaf node 404-408 includes respective metadata 412, 414, 416 having respective pointers 418, 420, 422 to respective media 424, 426, 428. Thus, the sequence node 402 may represent the functionality of a linear playlist of files.

Although the child nodes of the sequence node 402 are configured as leaf nodes in this implementation, child nodes of the sequence node 402 may represent any other type of node. For example, child nodes may be utilized to provide a complex tree structure as shown in FIG. 3. Node 306 of FIG. 3, for instance, is the child of another junction-type node, i.e. node 304.

FIG. 5 is an illustration of an exemplary implementation 500 in which a sequence node 502 and a plurality of nodes 504, 506, that are children of the sequence node 502 include metadata that specifies timing information for execution of the respective plurality of nodes 504, 506. Each of the plurality of leaf nodes 504, 506, 508 includes respective metadata 510, 512, 514 as previously described. The metadata 510 of leaf node 504, which is a first child node of the sequence specified by node 502, includes time 516 data that specifies a start time relative to the start time on the parent node, i.e. node 502. The other child nodes, i.e. leaf nodes 506, 508 have their start times specified relative to the previous node in the sequence. For example, suppose output of media corresponding to the leaf node 504 is desired when the node 502 is first executed. Additionally, when output of the media referenced by leaf node 504 ends, the media corresponding to leaf node 506 is to be output after a gap to 20 seconds. Therefore, the time 516 specified by the metadata 510 of leaf node 504 is "zero" and the time 518 specified by the metadata 512 of leaf node 506 is "20 seconds".

Specifying times 516, 518 relative to the previous node allows for defining a sequence where duration output of media referenced by each child node in the sequence is not known. When the start time for a node is not specified, as shown by the metadata 514 of leaf node 508, it means that the node, i.e. leaf node 508, should be immediately start output after the previous node, i.e. leaf node 506, has finished output.

FIG. 6 is an illustration of an exemplary implementation 600 in which a parallel node 602 includes metadata 604 specifying a plurality of leaf nodes 606, 608 that are children of the parallel node 602 are shown. In the previous implementations that were described in relation to FIGS. 4 and 5, sequence nodes were discussed in which nodes that are children of the sequence node were rendered, one after another. To provide rendering of nodes at the same time, the parallel node 602 may be employed.

The children of the parallel node 602 may be rendered simultaneously. For example, leaf node 606 and leaf node 608 are children of parallel node 602. Each of the leaf nodes 606, 608 includes respective metadata 610, 612 having respective pointers 614, 616 to respective media 618, 620. Each of the leaf nodes 606, 608 includes a respective time 622, 624 included in the respective metadata 610, 612 that specifies when the respective leaf nodes 606, 608 are to be rendered. The times 622, 624 on the leaf nodes 606, 608 are relative to the parallel node 602, i.e. the parent node. Each of the child nodes can represent any other type of node and combinations of nodes, providing for a complex tree structure with combined functionality. For example, a "junction" type node may also reference media, and so forth. Although metadata including time data has been described, a variety of metadata may be included on nodes of the media timeline, an example of which is described in the following implementation.

Media Timelines that are Configured to Store Metadata

Figure 7:
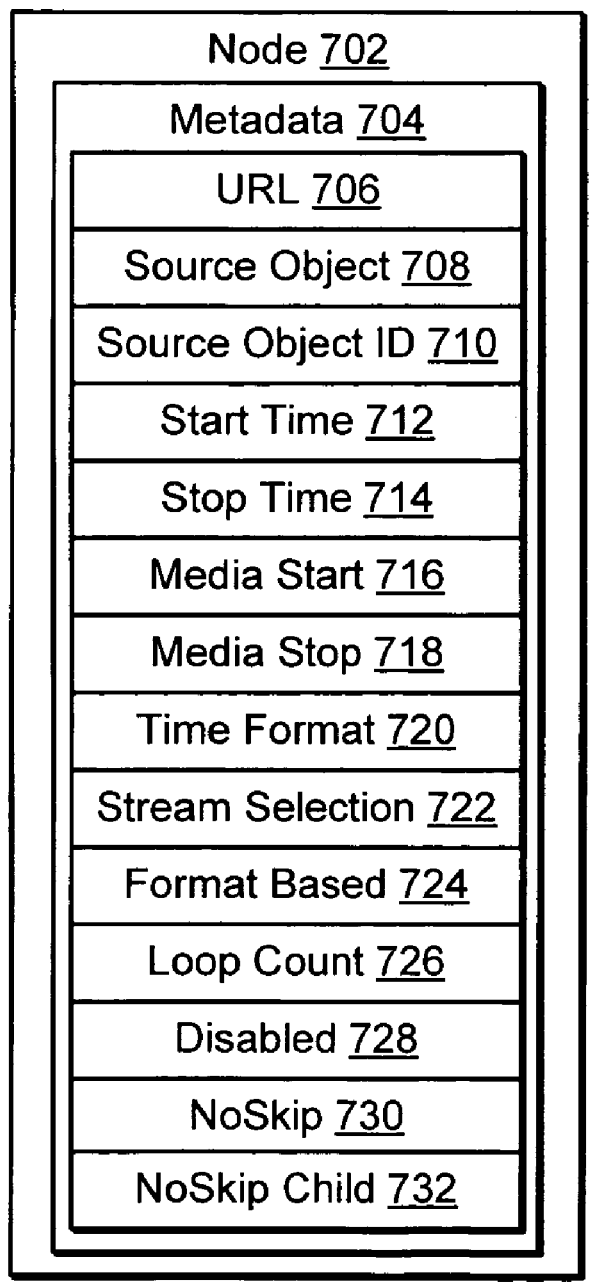
FIG. 7 is an illustration of a node in exemplary implementation showing examples of metadata that may be included in the node.

FIG. 7 is an illustration of an exemplary implementation 700 showing examples of metadata that may be included in a node. In this implementation 700, each node in the media timeline is capable of storing metadata. Metadata may be utilized to describe properties of the node, such as media referenced by the node, rendering order for children of the node, specify a node type (e.g., sequential, parallel, root, and leaf), and so forth. The media timeline may treat any property being set on the node as metadata. For example, properties like start and stop times of the node, the URL for the media of the node, and so on are stored as metadata.

Additionally, authors of the media timeline may add custom metadata to the nodes. For example, the application 202 of FIG. 2 may be configured as a media player that stores album art for a CD track on the leaf node corresponding to that particular track. Standard properties and custom properties may be treated in the same manner so that there is no ambiguity when obtaining the metadata. Therefore, even if each property described by the metadata is provided by a different respective interface or source, the media timeline provides a mechanism to track the various properties.

Further, properties from different sources may be aggregated by treating the metadata in a consistent manner by the media timeline. For example, a playlist may include a plurality of tracks, each having a different composer. Each track of the playlist may be represented as a leaf node that is a child of a sequence node. The media timeline may aggregate the metadata such that a query to the sequence node, i.e. the parent node, returns the composers of all the media in the playlist from each leaf node, i.e. the child nodes. Consistent use of metadata may also provide sorting for each of the nodes. For example, if all properties on a node are treated as metadata, an application may sort the nodes based on any properties defined in the metadata in a consistent fashion.

A node 702 may include a variety of metadata 704, such as properties that define playback behaviors and attributes for the nodes. Examples of properties defined by the metadata 704 are described as follows.

URL 706

This property holds the URL for the media. In the case of a file, the URL 706 property may provide the path to the file. For example, the URL 706 property may provide a path to a storage device to locate particular media.

SourceObject 708, SourceObjectID 710

In some instances, the source for the media cannot be specified by a URL. For example, a media source for outputting black color frames may not be locatable by a URL. The SourceObject 708 and SourceObjectID 710 properties allow the user to specify the media source by specifying an object which can resolve to a media source, such as the media source itself or some other object. When a media source is specified as a source object, SourceObject 708 property provides a pointer to the media source and the SourceObjectID 710 property specifies a globally unique identifier of the source object. In an implementation, the SourceObject 708 property takes precedence over the URL 706 property in case both are defined.

Start Time 712, Stop Time 714

The start and stop times 712, 714 define at what time the node 702 is to be started and stopped with respect to the other nodes. For nodes that are children of a parallel node, for instance, the start and stop times 712, 714 are defined relative to the parallel node, i.e. the parent of the children. For nodes that are children of a sequence node, the first child node includes start and stop times 712, 714 that are defined relative to the sequence node. The remaining nodes each include start and stop times that are defined relative to a previous sibling. In an implementation, it is not necessary to define the start and stop times 712, 714 for the node 702. For example, when the start and stop times 712, 714 are not specified, the start time 712 is assumed to be zero and the node 702 is stopped when the rendering of the media referenced by the node 702 is completed.

Media Start 716, Media Stop 718

Each node in a media timeline may reference media. The media start 716 and media stop 718 properties define a portion of the media that is to be output. For example, the node 702 may represent media from a file having a total length of 50 seconds. The user, however, might want to output only a portion of the media from 20 to 30 seconds in the file. To do this, the media start 716 may be specified as 20 seconds and the media stop 718 may be specified as 30 seconds.

The duration of the time period defined by the start time 712 and stop time 714 of the node, i.e. "nodetime" need not equal the duration of the time period defined by the media start 716 and the media stop 718, i.e. "mediatime". For example, when the specified nodetime is greater than the mediatime, output of the media referenced by the node 702 may be slowed. Therefore, the portion of the media defined by the media start 716 and the media stop 718 may be output for the duration of the time period defined by the start and stop times 712, 714 of the node, i.e. "nodetime". In other words, output of the portion may be extended such that the nodetime is equal to the mediatime. In another example, a last frame of the media may be frozen until the nodetime elapses, a video frame can be made blank (e.g., black), and so on. Similarly, if the nodetime is less than the mediatime, the media may be output at a faster rate such that output is finished within the specified nodetime. In a further example, output of the media may be truncated. For instance, any portion of the segment defined by the mediatime that is greater than the nodetime is not output. In an implementation, the media timeline itself does not enforce these behaviors, but rather these behaviors are read by the timeline source 124 when rendering the media timeline 122 as described in relation to FIG. 1.

When the media stop 718 for the node 702 is not specified, the media referenced by the node 702 is output until completion. For example, in a player scenario, a user may desire the output of a playlist of media that does not have the duration of each media item referenced. Additionally, "back to back" output of the media included in the playlist may be desired. To represent this case on the media timeline, a sequence node may be created having leaf nodes that are children of the sequence node which do not have a specified media stop 718 properties.

Time Format 720

The time-based properties described previously may have an accompanying time format 720 property (time format). Examples of time formats include 100 nanosecond units, frame number, time code, and so on. Thus, the time format 720 may specify the time format for the start time 712, stop time 714, media start 716 and media stop 718. Additionally, the time format 720 may specify different formats for each of the time-based properties. For instance, the start and stop times 712, 714 may utilize a time format of 100 nanosecond units, while the media start 716 and media stop 718 time formats may utilize frame counts.

Stream Selection 722

The stream selection 722 property can be utilized on the node 702 in a variety of ways. For example, the stream selection 722 property may act as a filter such that media having desired characteristics is provided. The node 702, for instance, may reference both audio and video streams of media, such as a television program. The user, however, may only be interested in only the video stream, even if the URL 706 specified on the node 702 points to both the audio and video streams. In such a case, the audio stream from the media is not exposed, such that it appears to the user that the node 702 provides only video media. Some other examples of stream selection include, selecting a language for the stream, selecting a bitrate for the stream, and so on. Additionally, files can contain multiple streams of the same major type. For example, some files contain many audio streams providing a choice of language and bitrate on each of these streams.

Format Based 724

Format based 724 properties may be utilized to specify other properties such as frame rate, pixel aspect ratio, audio sampling rate, and so on, that are desired from the node 702. The appropriate transforms for converting to/from these formats are then inserted into the rendered media timeline during playback.

Loop Count 726

The loop count 726 property may be used to specify how many times the rendering of the node 726 is to be repeated. For example, if the loop count 726 property is negative, the output of the media referenced by the node 702 may be repeated infinitely.

Disabled 728

The node 702 may be disabled by setting the disabled 728 property. For example, if the disabled 728 property is set to "true", the node 702 is ignored during rendering of the media timeline. For instance, a sequence of three leaf nodes may be provided in a media timeline. If the second node in the media timeline is disabled, i.e. the disabled 728 property is set to "true", output of the media referenced by the media timeline will appear as if the media timeline has only the first and third nodes.

NoSkip 730

The NoSkip 730 property is a feature which can be used by timeline authors to specify media which cannot be skipped during rendering of the media timeline. When the node 702 is specified as a NoSkip node, i.e. the NoSkip property is set to "true", the user cannot skip to another node after the specified node 702, and cannot fast forward the media being output as part of that node 702. The user, however, may skip to any node "before" that node 702. In another implementation, if the NoSkip 730 property is specified on a parent node, the user will not be able to skip any of the children in the subtree of that node. In a further implementation, the NoSkip 730 property applies only to a sequence node and its immediate children, e.g. children of the sequence node that directly follow the sequence node instead of being included in a another sequence node that is a child of that sequence node, and is not specified for a parallel node or its immediate children. For example, the NoSkip 730 property may be used to prevent the skipping of advertisements referenced by leaf nodes that are children of a first sequence node. A second sequence node may also be a child of the first sequence node, and include leaf nodes that reference media that can be skipped, such as a television program.

The NoSkip 730 property may also be utilized to define collections of nodes through which a user may navigate. For example, a media timeline may include a sequence of ten leaf nodes, with the third and seventh nodes being NoSkip nodes, i.e. the NoSkip property is set as "true". Therefore, the user may skip the rendering of the first and second leaf nodes, but cannot skip to the fourth, fifth, sixth, seventh, eighth, ninth, or tenth nodes. Similarly during the rendering of the media timeline from node four to node seven, the user may skip to any node below the seventh node, but may not skip to a node "above" the seventh node, i.e. the eighth, ninth and tenth nodes.

NoSkip Child 732

Media timelines may support sparse children, i.e. all nodes are not loaded and/or created on the media timeline when the media timeline is initially loaded. Therefore, the children may be loaded and/or created as needed. Further discussion of dynamic loading and creation of nodes may be found in relation to FIGS. 12 and 13. When loading the nodes in a media timeline in this instance, parent nodes may be loaded which have child nodes that are specified as "NoSkip". To indicate that there is the NoSkip 730 property for a child node, the NoSkip child 732 property for the parent node may be used.

The NoSkip child 732 property may be set at a parent node to indicate whether the parent node includes a child node having the NoSkip 730 property set as "true". During the rendering of the media timeline, the NoSkip child 732 is used to indicate that all the previous siblings of a node should be checked to determine if navigation to the node is valid. NoSkip child 732 may also be set on a parallel node. For example, if any node in a subtree of the parallel node has the NoSkip 730 property set as "true". In this way, navigation between nodes may be provided that protects the use of the NoSkip 730 property.

When a node with the NoSkip 730 property set as "true" is added to the media timeline, the media timeline may automatically set the NoSkip Child 732 property as "true" on all the parents of the added node. This way a rendering engine, e.g. timeline source 124 of FIG. 1, can optimize which nodes of the media timeline to load and check to determine if the NoSkip 730 property is set as "true".

Timeline Effects

Timeline effects allow the author of a media timeline to specify components which analyze and/or change the appearance of the media. For example, the author might want to show a video in black & white, add echo to an audio file, show one video on top of another (e.g., picture in picture), and so on. In an implementation, an effect is not a separate node by itself. To provide the effect for the media, the author may specify effects in the metadata in the node. For example, the metadata may include an array of effects that are defined on the node. The array may specify a series of effects to be applied to the output of that node, i.e. when the media referenced by the node is rendered. In this implementation, the effect is not an object which actually implements the effect, but rather specifies properties and attributes which describe how to create and apply the effect. This is similar to how the node references the media in the previous implementations. For example, as discussed in relation to FIG. 3, the leaf nodes 308-312 themselves do no contain the media, but rather include respective metadata 320-324 having respective pointers 326, 328, 332 which specify how to obtain the media. The component which actually implements the effect is loaded at runtime by the timeline source that executes the media timeline. Although metadata that includes effect has been described, the effects may also be specified separately. Additionally, in another implementation, the effect is provided by an object in the media timeline that implements the effect.

Effects specified on nodes of a media timeline may have times that are specified relative to the start time of that node. For example, an effect may be specified on a leaf node that has a start time of ten seconds. Therefore, the effect will be applied to the node, when rendered, after that node has begun output and ten seconds have elapsed.

Multiple effects can be specified on a node. Additionally, the author of the media timeline may also control the order in which these effects are applied. For example, the author may set a priority on the effect. There are a variety of effects that may be specified by a node. Examples of effects that can be specified on the media timeline include: (1) a simple effect; (2) a composite effect; and (3) a transition effect. Further discussion of these exemplary effects may be found in relation to FIGS. 8-10.

Simple Effect

A simple effect represents a component which receives a single stream of audio/video and outputs another stream. In other words, it is a one-in/one-out component. For example, an echo effect may receive an audio stream and output a modified audio stream that echoes, provide a "black and white" effect in which video is shown as black and white, an age effect in which video is made to appear as if it was captured several decades ago, and so on.

Figure 8:
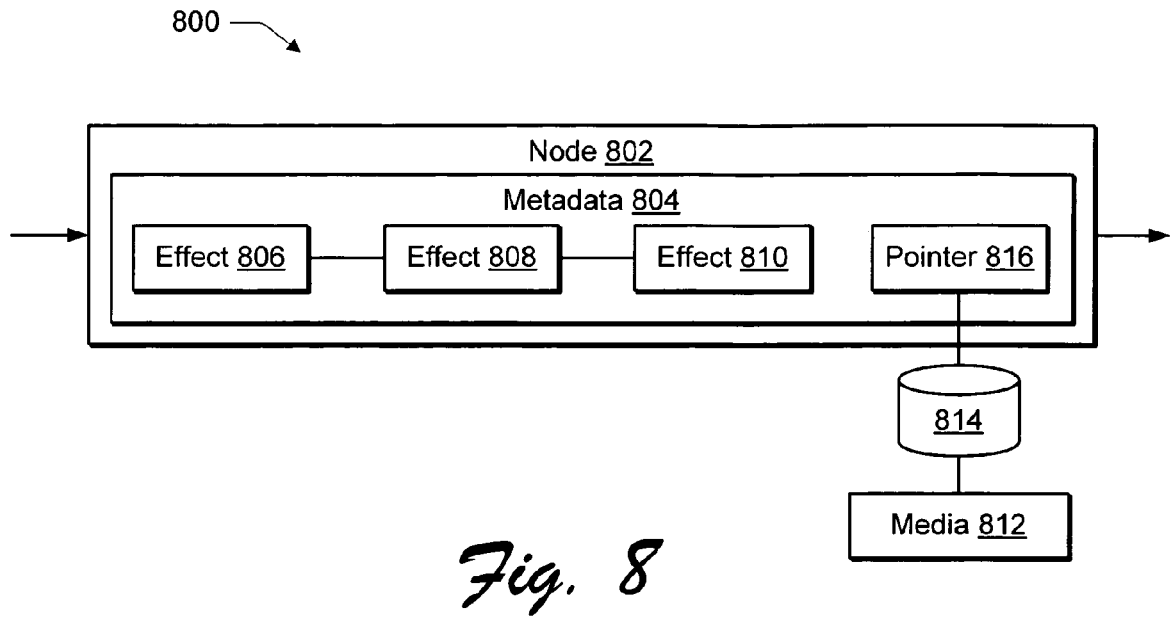
FIG. 8 is an illustration of a node in an exemplary implementation showing metadata included in the node that specifies a plurality of simple effects.

FIG. 8 is an illustration of an exemplary implementation 800 in which a node 802 includes metadata 804 that specifies a plurality of simple effects 806, 808, 810. As shown in FIG. 8, the plurality of simple effects 806-810 may be applied to media 812 included in a storage device 814 that is referenced by a pointer 816. In this example, the plurality of effects 806-810 are concatenated, i.e. the output for the first effect 806 goes to the input of the second effect 808 and so on, to provide the multiple effects to the media 812. Each of the plurality of effects 806-810 may be given a priority to provide an order for processing the effects. For instance, the priorities of the effects may determine the order the effects are concatenated. If there is a contention on the priority, the effects may be added in the order each effect was specified in the effect array.

In an implementation, the duration of the plurality of effects 806-810 does not change the duration of the media 812. For example, the processing of the plurality of effects 806-810 may be truncated at the time boundaries of the node 802. For instance, the rendering of the media 812 may have a duration of 10 seconds. The processing of the plurality of effects 806-810, however, may have a duration of 20 seconds. In such an instance, the timeline source 124 of FIG. 1 may finish processing of the plurality of effects 806-810 for node 802 at 10 seconds.

When defining the effects 806-810, the author of the timeline may explicitly specify the inputs and the outputs of each of the effects 806-810. For example, each of the effects 806-810 may include data that describes which stream is connected to which effect input. Each of the effects 806-810 may also have respective data that describes the major type of the respective effect's 806-810 output, e.g. audio, video, and so on. Further, each of the effects 806-810 may include metadata that describes a start time and/or a stop time of the effect within the node.

Composite Effects

Figure 9:
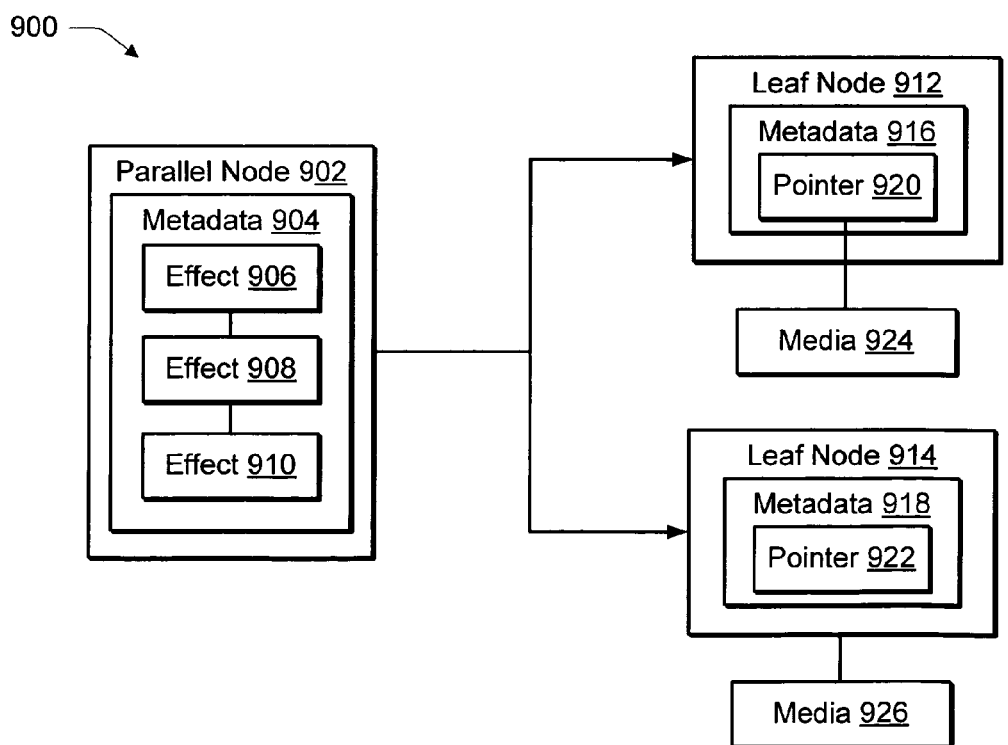
FIG. 9 is an illustration of an exemplary implementation showing a parallel node that provides a composite effect to the outputs of two or more child nodes.

A composite effect may be used to process media of the children of a parallel node to give a resultant output. For example, FIG. 9 is an illustration of an exemplary implementation 900 showing a parallel node 902 that provides a composite effect to the outputs of two or more child nodes. Parallel node 902 in this implementation is similar to the parallel node 602 that was described in relation to FIG. 6.

Parallel node 902 includes an array of composite effects 906, 908, 910. When specifying a composite effect, the author of the media timeline specifies how to connect the inputs of the effects 906-910 and also the major types for the outputs from the effects 906-910. For example, leaf node 912 and leaf node 914 may be configured as the children of the parallel node 902. As previously described, each leaf node 912, 914 includes respective metadata 916, 918 having respective pointers 920, 922 that reference respective media 924, 926. The leaf nodes 912, 914, when rendered, provide media 924, 926 for output.

The effects 906, 908, 910 are applied to the output of the media 924, 926 that are specified by the parallel node 902. For example, the parallel node 902 may provide a rotating cube with a different media (e.g., video) on each face of the cube, a scrolling roll of film with different media playing in each frame of the film, and so forth.

Although parallel node 902 was described as applying the plurality of effects 906-910 to each of the leaf nodes 912, 914, in additional implementations the parallel node 902 might apply the effects 906-910 to only a few of the children of the parallel node 902. In other words, the effects 906-910 need not be applied to all of the nodes that are children of the parallel node 902. For example, the metadata 904 and/or effects 906-910 may specify one or more particular nodes to apply one or more of the plurality of effects 906-910.

Transition Effect

Figure 10:
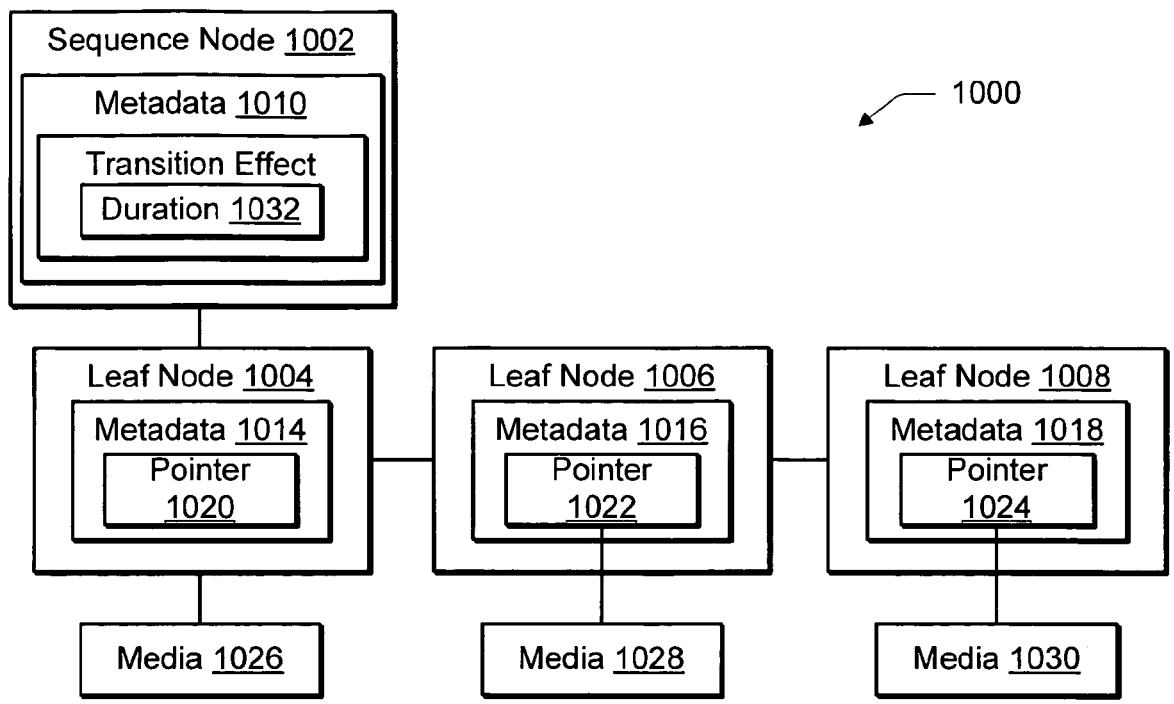
FIG. 10 is an illustration of an exemplary implementation in which a transition effect is specified to supply an effect between an output of media referenced by a previous node to an output of media referenced by a subsequent node.

FIG. 10 is an illustration of an exemplary implementation 1000 in which a transition effect is specified to supply an effect between an output of media referenced by a previous node to an output of media referenced by a subsequent node. In FIG. 10, a sequence node 1002 is shown that is similar to sequence node 402 that was described in relation to FIG. 4. The sequence node 1002 has a plurality of leaf nodes 1004, 1006, 1008 that are children of the sequence node 1002. Each of the plurality of leaf nodes 1004-1008 includes respective metadata 1014-1018 having respective pointers 1020-1024 that reference respective media 1026-1030.

The sequence node 1002 include metadata 1010 that describes a transition effect 1012 that is to be employed between output of the media 1026-1030 referenced by the respective leaf nodes 1004-1008. Thus, the transition effect 1012 is applied to the media 1026-1030 originating from the children of the sequence node 1002. The transition effect 1012 is utilized to combine two or more media 1026-1038 into a single output. Additionally, the transition effect 1012 may include data that specifies one or more of leaf nodes 1004-1008 to which the transition effect is to be applied. For example, the data may specify that the transition effect 1012 is to be employed between the output of media 1026, 1028. The first input to the transition effect 1012 is supplied by the node for which it is defined, i.e. leaf node 1004. The next input to the transition effect 1012 is the next node in the sequence, i.e. leaf node 1006. Example of transition effects include an audio cross fade between two nodes that are output in sequence, a "swipe" of a first video with a second video, and so on.

The transition effect 1012 has a duration 1032. The duration 1032 may be used to specify an amount of overlap desired between the two or more nodes in a sequence. For example, the second input in the sequence, i.e. media 1026, may be output such that it overlaps for the duration 1032 of the transition effect 1012. Hence, an output duration of the sequence node 1002 becomes a function of the times specified on the leaf nodes 1004-1008 and the overlap specified by the duration 1032 of the transition effect 1012.

Global effects may also be specified. For example, the transition effect 1012 may specify a global transition for each of the children of that node, e.g. leaf nodes 1004-1008 of sequence node 1002. Therefore, if the author of a media timeline desires the use of the same transition for all the leaf nodes 1004-1008, the author may do so by specifying the transition effect 1012 as a global transition. Thus, by specifying a global transition, the author need not specify a separate transition for each node.

Effect Metadata

Figure 11:
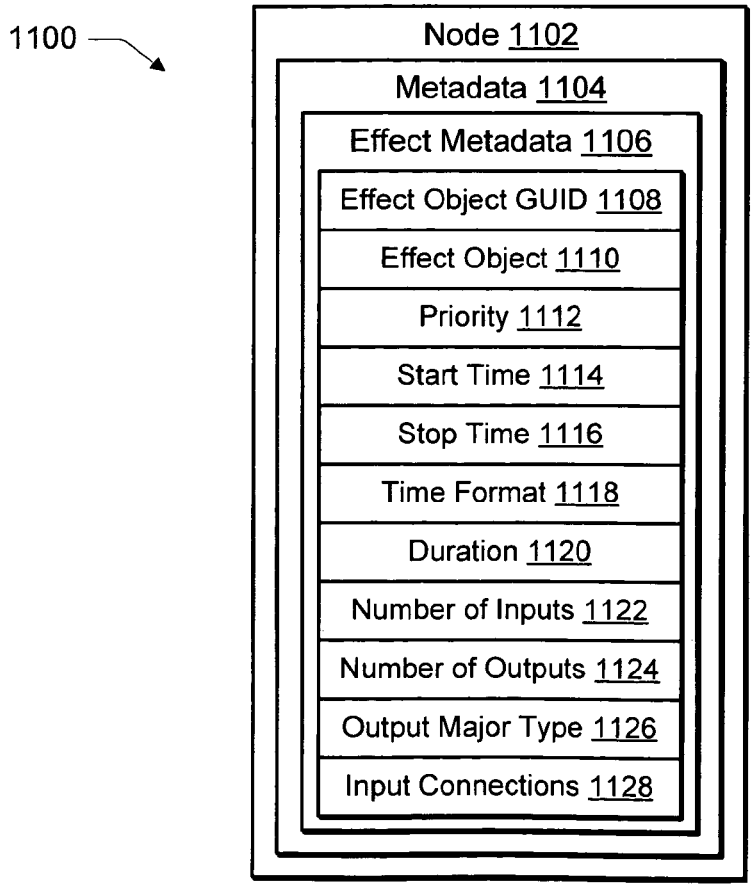
FIG. 11 is an illustration of an exemplary implementation showing a node having metadata that includes a plurality of effect metadata.

FIG. 11 is an illustration of an exemplary implementation 1100 showing a node 1102 having metadata 1104 that includes a plurality of effect metadata 1106. Like the metadata 704 specified on the node 702 as described in relation to FIG. 7, the effect metadata 1106 may also specify a variety of properties for an effect. For example, the effect metadata 1106 may define standard properties which have a specific meaning for the media timeline. The effect metadata 1106 may be used to configure transform objects which are utilized to provide the effect. Transform objects, for instance, may publish their own set of properties, which are used to configure the transform object to provide the effect. For example, for a color converter transform object there are specific properties for controlling the hue, saturation and brightness. In addition to these properties, other custom properties of interest may be specified for the effect. The following is a listing of examples of effect metadata 1106 that is supported by the media timeline.

Effect Object GUID 1108

Similar to how nodes may reference media, an effect may reference a transform object that provides the effect. The effect object GUID 1108 property specifies the GUID to be used to create the transform object that provides the effect. For example, during output of the media, the transform object referenced by the effect object GUID 1108 may be created when needed to provide the effect.

Effect Object 1110

The node 1102 may utilize the effect object 1110 property as a pointer to reference an effect object that provides the effect. The referenced effect object may be used directly during output of the media of the node 1102. The effect object 1110 property takes precedence over the effect GUID, if both are specified.

Priority 1112

As previously described, when effects are concatenated together, the priority 1112 property may be used to specify the ordering of the effects. If there is more than one effect with the same priority, the effects are applied in the order in which the effects were added to the node 1102.

Start Time 1114, Stop Time 1116

The start and stop times 1114, 1116 are specified relative to the node 1102 on which the effect is specified. The start and stop times 1114, 1116 define the time at which the effect will be active. If these properties are not specified, the effect will be applied for the entire duration of the output of the media referenced by the node 1102. These properties can be applied to both simple effects that were described in relation to FIG. 8 and composite effects that were described in relation to FIG. 9.

Time Format 1118

The start and stop times 1114, 1116 may be specified in a variety of formats. The time format 1118 property may be used to specify the format of these time values. A variety of time formats may be utilized, such as 100 nano-second units, frame numbers, time codes, and so on.

Duration 1120

As previously described in relation to FIG. 10, the duration 1120 property may be used to specify the duration of a transition between the output of respective media. For example, the duration 1120 may be used to specify an amount of overlap between the output of media referenced by two consecutive nodes.

Number of Inputs 1122, Number of Outputs 1124

Simple effects utilize one input and one output, and therefore the number of inputs and outputs 1122, 1124 may be set automatically in the media timeline for simple effects. A transition effect may employ two inputs and one output. Therefore, the number of inputs and outputs 1122, 1124 may also be set automatically in the media timeline for transition effects. For composite effects, an author may define as many inputs and/or outputs as desired. Therefore, the number of inputs and outputs 1122, 1124 may be set by the author to reflect the number of inputs and outputs for the transform object that provides the effect.

Output Major Type 1126

The output major type 1126 is specified for each output of the effect. Specifying output major type 1126 property facilitates connecting the effect to other effects or destinations. For example, the author of a media timeline may readily determine the major type, i.e. audio, video, and so on, of the output and therefore efficiently specify connections between relevant effects, e.g. audio effect to audio effect.

Input Connections 1128

Once the effect has been defined, the author may specify media that is to be processed by the effect. The input connections 1128 property may be used to identify the media to be connected to each of the effect inputs.

Dynamic Creation and Loading of Nodes of a Media Timeline

Dynamic creation and loading of nodes of a media timeline may be utilized for efficient rendering of the media timeline. By improving rendering efficiency, the media timeline may be utilized on low resource devices, such as devices having limited hardware and/or software resources. For example, dynamic creation of the media timelines may include delayed creation of the nodes of the media timeline. The children of a parent node, for instance, need not be created until needed. The delayed creation of the nodes may be utilized to improve start-up and response times for media timelines having a significant number of nodes and/or a large amount of data for each node. For instance, a media player may be utilized to create and playback a playlist from a media library that contains a significant number of selections. Creating such a playlist might require multiple queries to the media library, which may take a significant amount of time, processor and memory resources. By using delayed creation of the nodes, the playlist can be built on an "as needed" basis, thereby utilizing only as much processing and memory resources as required by the nodes needed at any one particular time. There are a wide variety of implementations that may be utilized for dynamic creation and/or loading of nodes of a media timeline.

Figure 12:
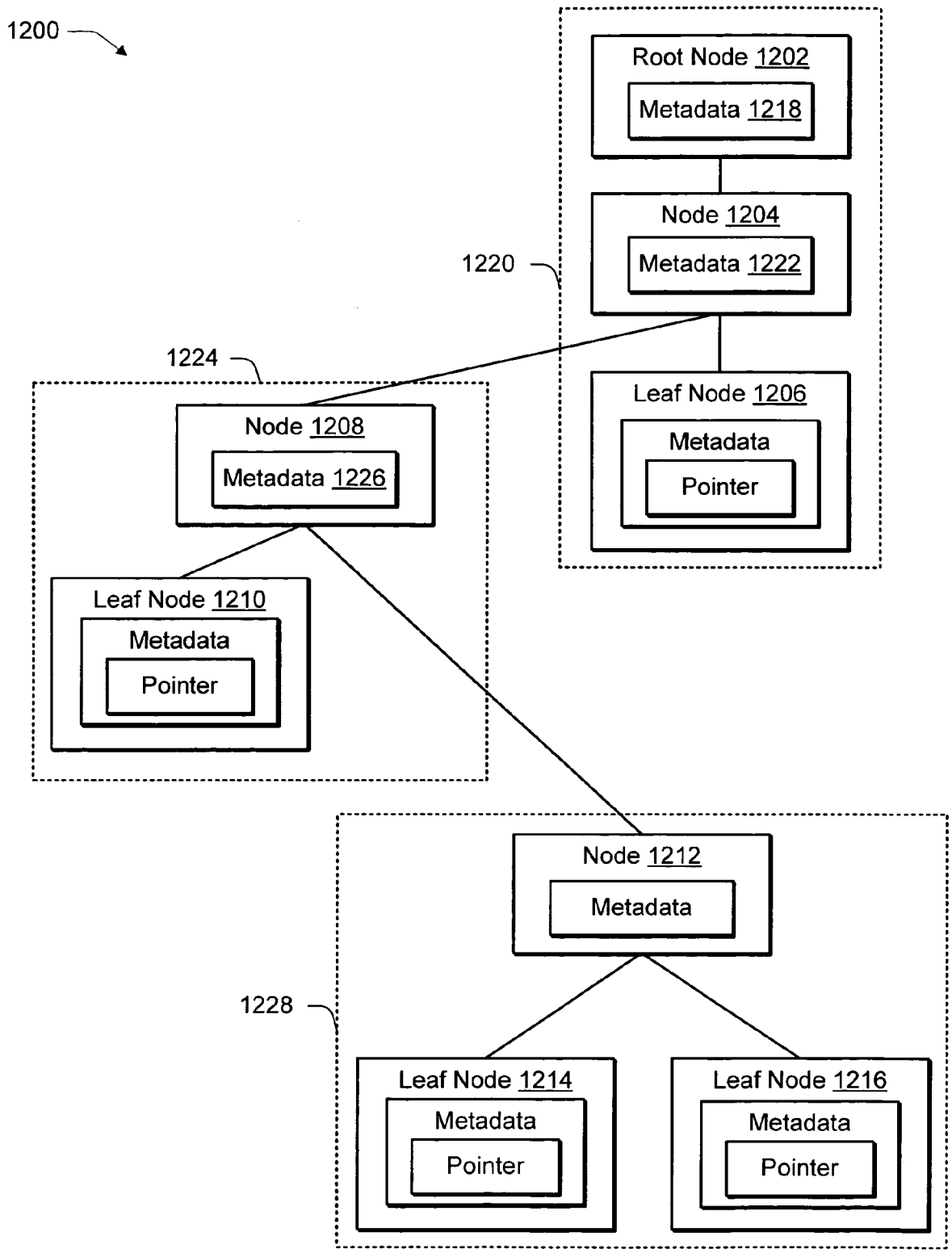
FIG. 12 is an illustration a media timeline in an exemplary implementation of dynamic loading in which the nodes of the media timeline are loaded based on metadata that is included in the nodes.

FIG. 12 is an illustration of an example of a media timeline 1200 in an exemplary implementation in which the nodes of the media timeline are dynamically loaded based on metadata that is included in the nodes. The media timeline 1200 is illustrated as a tree structure that includes a root node 1202 and a plurality of nodes 1204-1216 that are children of the root node 1202. To render the media timeline 1200, the root node 1202 is first implemented and the metadata 1218 contained therein is examined. The metadata 1218 specifies a first grouping 1220 that includes nodes 1204, 1206. Therefore, when the root node 1202 is rendered, node 1204 and node 1206 are also loaded for rendering.

During or after the rendering of media referenced by the node 1206, metadata 1222 of node 1204 is examined that specifies a second grouping 1224 that includes node 1208 and 1210. Therefore, node 1208 and 1210 are loaded and media is output that is referenced by node 1210. Likewise, the metadata 1226 of node 1208 specifies a third grouping 1228 that includes nodes 1212, 1214, 1216. Therefore, nodes 1212, 1214, 1216 are loaded to output data referenced by nodes 1214, 1216 after the output of data referenced by node 1210 is completed.

Figure 13:
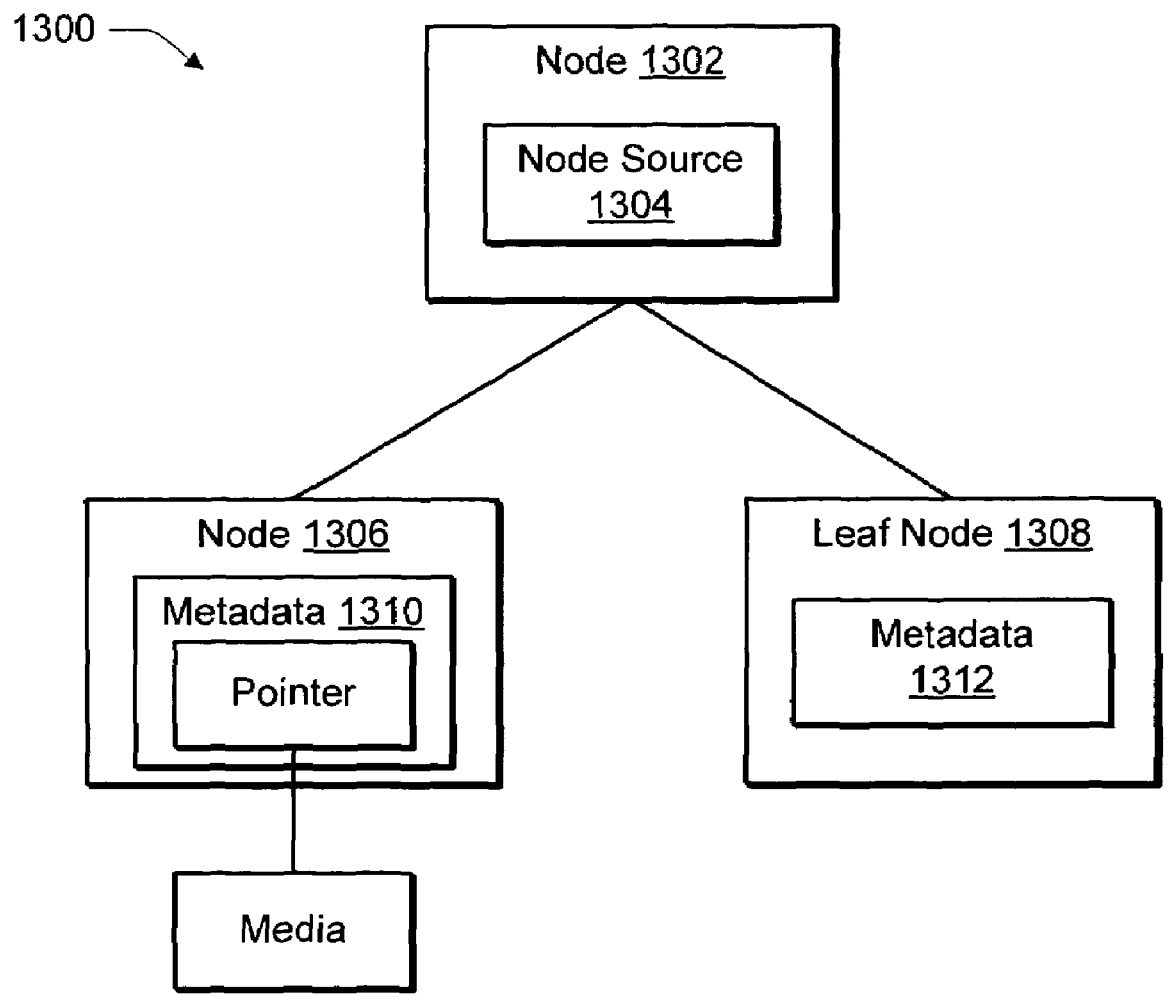
FIG. 13 is an illustration of a media timeline in an exemplary implementation of dynamic loading in which the nodes of the media timeline are defined and implemented on an as-needed basis by a node source.

FIG. 13 is an illustration of a media timeline 1300 in an exemplary implementation in which the nodes of the media timeline are defined and implemented on an "as needed" basis by a node source. In the previous implementation that was described in relation to FIG. 12, the media timeline 1200 was previously created and the nodes loaded on an "as needed" basis. In this implementation, the author defines a number of nodes that are children of a node 1302 of the media timeline 1300. The nodes are then created on an "as needed" basis during the rendering of the media timeline 1300. This is performed by attaching a node source 1304 module (node source) to the node 1302. The node source 1304 includes sufficient data such that, when executed, the node source 1304 may create the children of the node 1302, i.e. nodes 1306, 1308, and "fill-out" the properties of the nodes 1306, 1308, such as to supply metadata 1310, 1312 that defines properties and interrelationships as previously described in relation to FIG. 7. Therefore, when a particular one of the nodes 1306, 1308 is needed, the node source 1304 is implemented, e.g. called, to create the particular one of the nodes 1306, 1308. The node source 1304, for instance, may be executed to create the nodes 1306, 1308 in response to a request from the timeline source 124 of FIG. 1.

Dynamic Changes to Nodes in a Media Timeline

In one or more implementations, the media timelines are configured to be dynamically changed. For example, nodes of the media timeline may be removed, added or changed during the rendering of the media timeline by a timeline source. To provide for dynamic changes to the nodes, each node can generate events.

Figure 14:
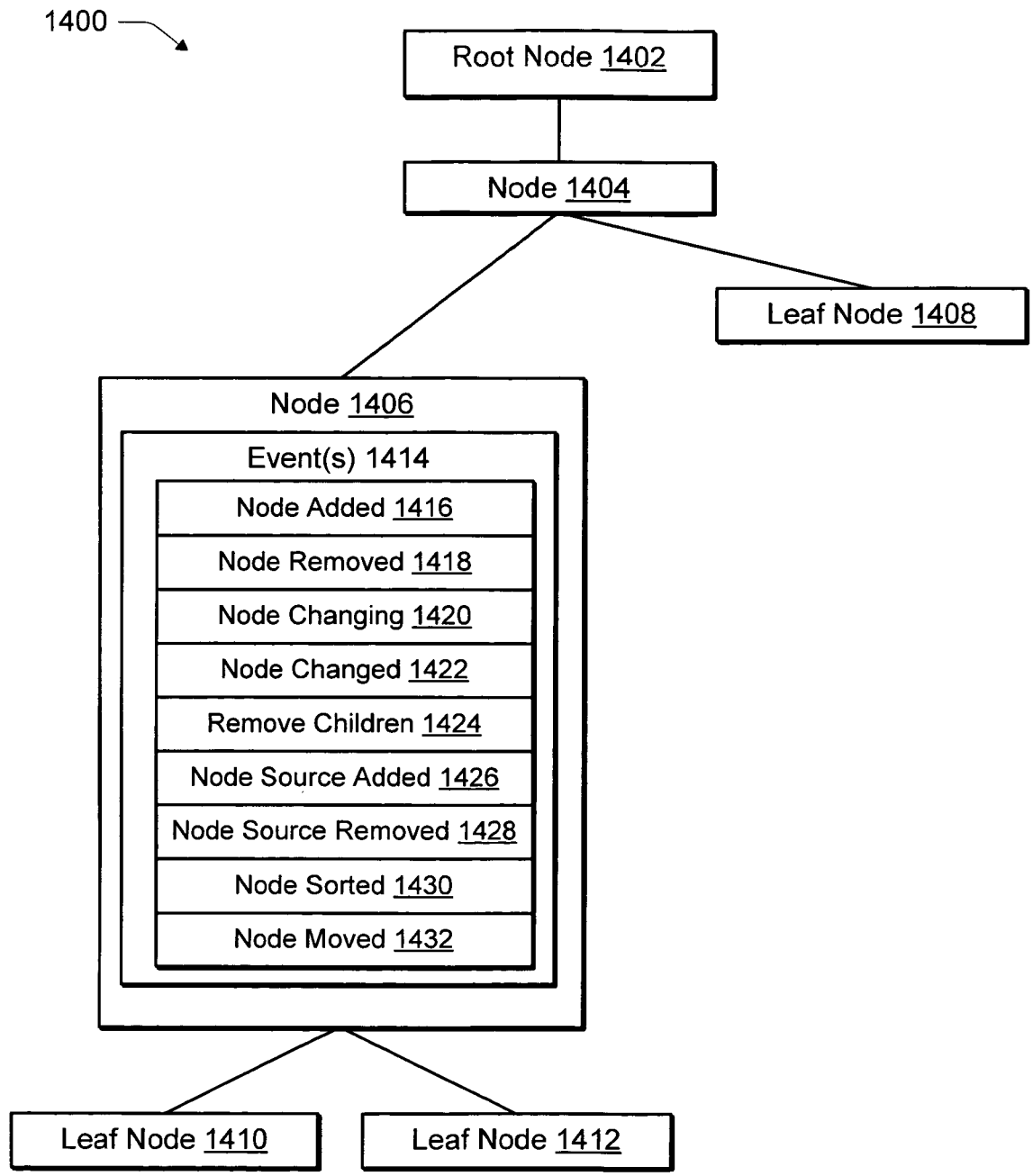
FIG. 14 is an illustration of a media timeline in an exemplary implementation in which events are provided by a node such that changes that occur to the media timeline may be communicated to nodes that may be affected by the changes.
Figure 15:
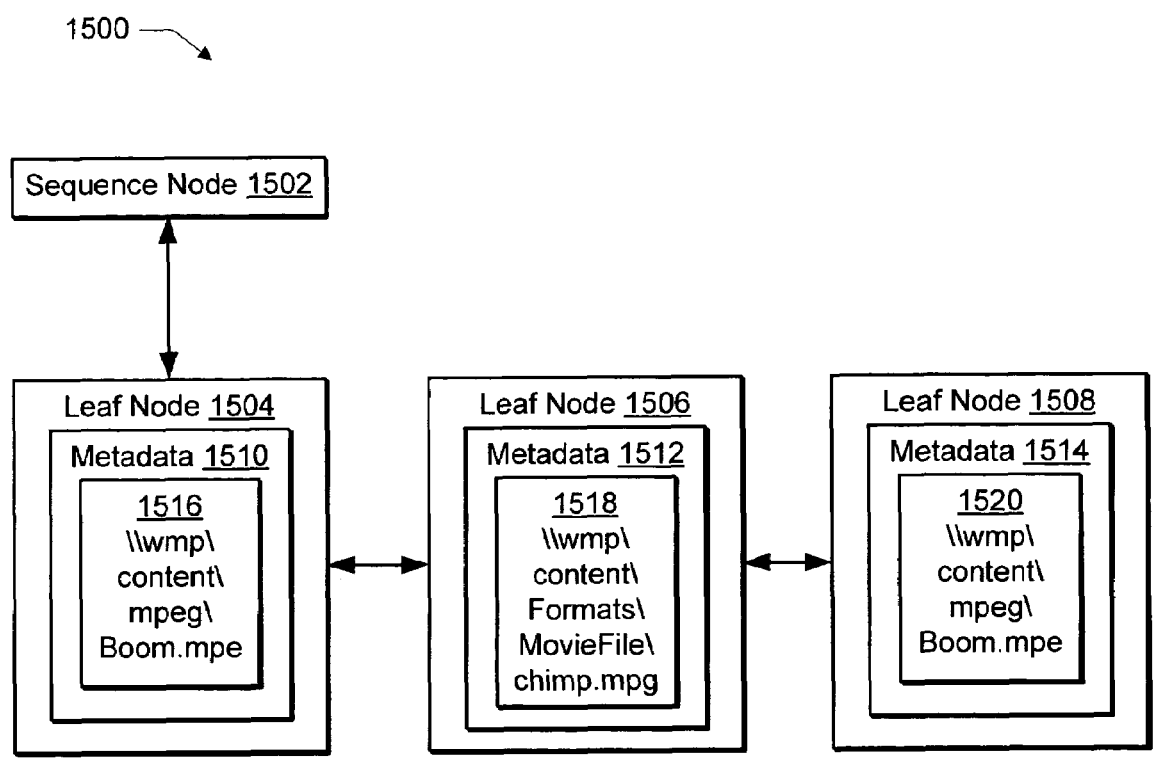
FIG. 15 is an illustration of an exemplary implementation showing a media timeline that includes a sequence node and three leaf nodes described by a Windows® Media Player Playlist file identified by an ASX file extension.

FIG. 14 is an illustration of a media timeline 1400 in an exemplary implementation in which events are provided by a node to such that changes that occur to the media timeline 1400 may be communicated to nodes that may be affected by the changes. The media timeline 1400 includes a root node 1402 and a plurality of nodes 1404-1412 that are children of the root node 1402. Nodes 1408-1410 are utilized to reference media as previously described.

Each of the nodes 1402-1412 may generate events that may be utilized to inform other nodes of the media timeline 1400 that may be affected by changes to the node and/or changes to children of that node. For example, all events for node 1406 and any children of the node 1406, i.e. nodes 1410-1412, may be communicated to the root node 1402 and/or the author of the media timeline 1400. In other words, events in the media timeline 1400 may progress "up" the tree to the root of the tree. In this way, "eventing" may be utilized inform various nodes of the media timeline 1400 about dynamic changes to the timeline structure. Additionally, nodes of the media timeline 1400 may subscribe to events initiated by other nodes of the media timeline. Node 1408, for instance, may subscribe to receive events from node 1406 even though node 1408 is not a "parent" of the node 1406. Furthermore, components using the timeline, e.g. the media foundation 204 components of FIG. 2, can register to receive events initiated by any of the nodes. A variety of events 1414 may be supported by one or more nodes 1402-1412, examples of which are described as follows.

Node Added 1416

This event is issued when a node is added to the media timeline 1400. For example, node 1412 may be added to the media timeline 1400 to provide output of additional media referenced by the node 1412. Node 1406, when informed of the adding of node 1412, may issue the node added 1416 event such that it is communicated to the root node 1402 through node 1404. Thus, in this example, each node 1402-1406 that is a parent of the newly added node 1412 is notified of events that are initiated by children of that node.

Node Removed 1418

The node removed 1418 event is issued when a node is removed from the media timeline 1400. Continuing with the previous example, node 1412 may be removed from the media timeline 1400 to remove the output of the media referenced by the node 1412. Node 1406, when informed of the removal of node 1412, may issue the node removed 1418 event such that it is communicated to the root node 1402 through node 1404. Thus, in this example, each node 1402-1406 that is a parent of the removed node 1412 is also notified.

Node Changing 1420

The node changing 1420 event is issued when metadata on a node of the media timeline 1400 is being changed. Node 1406, for instance, may include metadata, such as the metadata 704 described in relation to FIG. 7. Changes to the metadata may cause the node 1406 to issue the node changing 1420 event, which may be communicated to the application 202 of FIG. 2 and/or parents of the node 1406, i.e. nodes 1402, 1404. Thus, the node changing 1420 event may be utilized to inform other nodes and/or applications that utilize the node that changes are being made to the node 1406, and therefore respond according, such as to wait to render the node until a node changed 1422 event is received.

Node Changed 1422

The node changed 1422 event is issued when metadata on a node of the media timeline 1400 has been changed. Continuing with the previously example, node 1406 issued the node changing 1420 event such that other nodes and/or applications are informed that changes are being made to the node 1406. When the changes are complete, the node 1406 may issue the node changed 1422 event to inform the applications and/or nodes that the changes have been completed. In this way, the node 1406 may utilize the node changed 1422 event to inform that it is ready for rendering.

Remove Children 1424

The remove children 1424 event is issued when all of the children of a node are removed. Nodes 1410, 1412, for instance, may be removed from the media timeline 1400. Node 1406 issues the remove children 1424 event to inform the root node 1402 that the children, i.e. nodes 1410, 1412, of node 1406 have been removed. Thus, the remove children 1424 event may be utilized instead of issuing the node removed 1418 for each of the nodes 1410, 1412.

Node Source Added 1426, Node Source Removed 1428

The node source added 1426 event is issued when a node source is added to a node, such as the node source 1304 described in relation to FIG. 13. Likewise, the node source removed 1426 event is issued when a node source is removed from a node.

Node Sorted 1430

The node sorted 1430 event is issued when one or more nodes are sorted. For example, the media timeline 1400 may support a function in which the nodes 1402-1412 are sorted according to one or more criteria, such as chronologically, based on dependencies, and so forth. Therefore, the node sorted 1430 event may be initiated by the node 1406 when that node and/or children of the node 1406 (e.g., nodes 1410, 1412) are sorted.

Node Moved 1432

The node moved 1432 event is issued when a node is moved. For example, the node 1406 may be moved in the media timeline 1400 such that the node 1406 is a child of a different node, e.g. node 1402. Therefore, the node moved 1432 event may be initiated by the node 1406 and/or a parent of the node (e.g. the previous parent and/or the new parent node) when node 1406 is moved.

Read-Only Media Timelines

The author of a media timeline can mark all or a portion of the media timeline as read-only. This may be utilized to protect the functionality of the media timeline. In a first scenario, the author of the timeline does not want the user to change the media experience, such as to skip and/or delete advertisements. In another scenario, the author might want to dynamically change the media timeline, but does not want other components to modify it. In yet another scenario, the author might allow other components to set custom metadata on the timeline nodes, but not add new children to the timeline.

The media timeline can be customized to suit one or all of these read-only scenarios. Read-only media timelines may be implemented by creating a read-only wrapper of a media timeline. The read-only wrapper contains nodes which mirror the structure of the original timeline, i.e. are "cloned" from the nodes of the original timeline. The cloned nodes of the read-only media timeline may contain pointers back into the original timeline's nodes. Additionally, each of the cloned nodes may be configured to subscribe to events generated on the nodes of the original timeline. This allows the cloned timeline's structure to be kept updated as the original media timeline changes, such as changes to the structure of the "tree" of the original media timeline.

The cloned nodes of the read-only media timeline may be configured to fail functions which allow the user to add/remove nodes to the read-only media timeline. When creating a read-only timeline, the author may also specify whether metadata for the cloned nodes should be modifiable. This design allows the author of the media timeline to modify the media timeline as much as desired while other components, e.g. applications that execute the read-only media timeline, have read-only or restricted access to the media timeline structure.

In an implementation, metadata 314 of the root node 302 of the media timeline 300 of FIG. 3 may be marked such that the media timeline 300 may not be edited by a user. In another implementation, a particular node and/or groupings of nodes of the media timeline may be marked as read-only. For example, referring again to FIG. 3, the metadata 320 of leaf node 308 may be marked as read-only. In another example, the metadata 318 of node 306 is marked as read-only such that node 306, leaf node 310 and leaf node 312 may not be edited.

Exemplary Media Timeline Implementations

The media timelines previously discussed may employ a variety of methods of storing and restoring timeline data, such as one or more Windows® Media Player Playlist files, eXecutable Temporal Language (XTL) files, and so on.

A media timeline, for instance, may be described as the following Windows® Media Player Playlist file identified by an ASX file extension.

<Asx Version="3.0">
    <Entry>
    <Ref href="file://\\wmp\content\mpeg\Boom.mpe"/>
    </Entry>
    <Entry>
    <Ref
       href="\\wmp\content\Formats\MovieFile\chimp.mpg"/>
    </Entry>
    <Entry>
    <Ref href="file://\\wmp\content\mpeg\Boom.mpe"/>
    </Entry>
    </Asx>

This ASX file specifies three files for output, back to back. No start and stop times have been specified for the files. The ASX file may be represented by the media timeline 1500 shown in FIG. 15 that includes a sequence node 1502 and three leaf nodes 1504, 1506, 1508. Each of the leaf nodes 1504-1508 includes respective metadata 1510, 1512, 1514 that describes respective sources 1516, 1518, 1520 for media to be output by the media timeline 1500.

Another example of a media timeline is shown in the following XTL file.

<timeline>
    <group type="video">
    <track>
    <clip src="V1.wmv" start="0" stop="30" mstart="50" mstop="80"
    />
    <clip src="V2.wmv" start="30" stop="40" mstart="0"/>
    </track>
    </group>
    <group type="audio">
    <track>
    <clip src="A1.asf" start="20" stop="40" mstart="0"/>
    <clip src="A2.asf" start="40" stop="60" mstart="0"/>
    </track>
    </group>
    </timeline>

This XTL file describes two tracks, e.g., streams, of media for output. One of the tracks is an audio track and the other is a video track.

Figure 16:
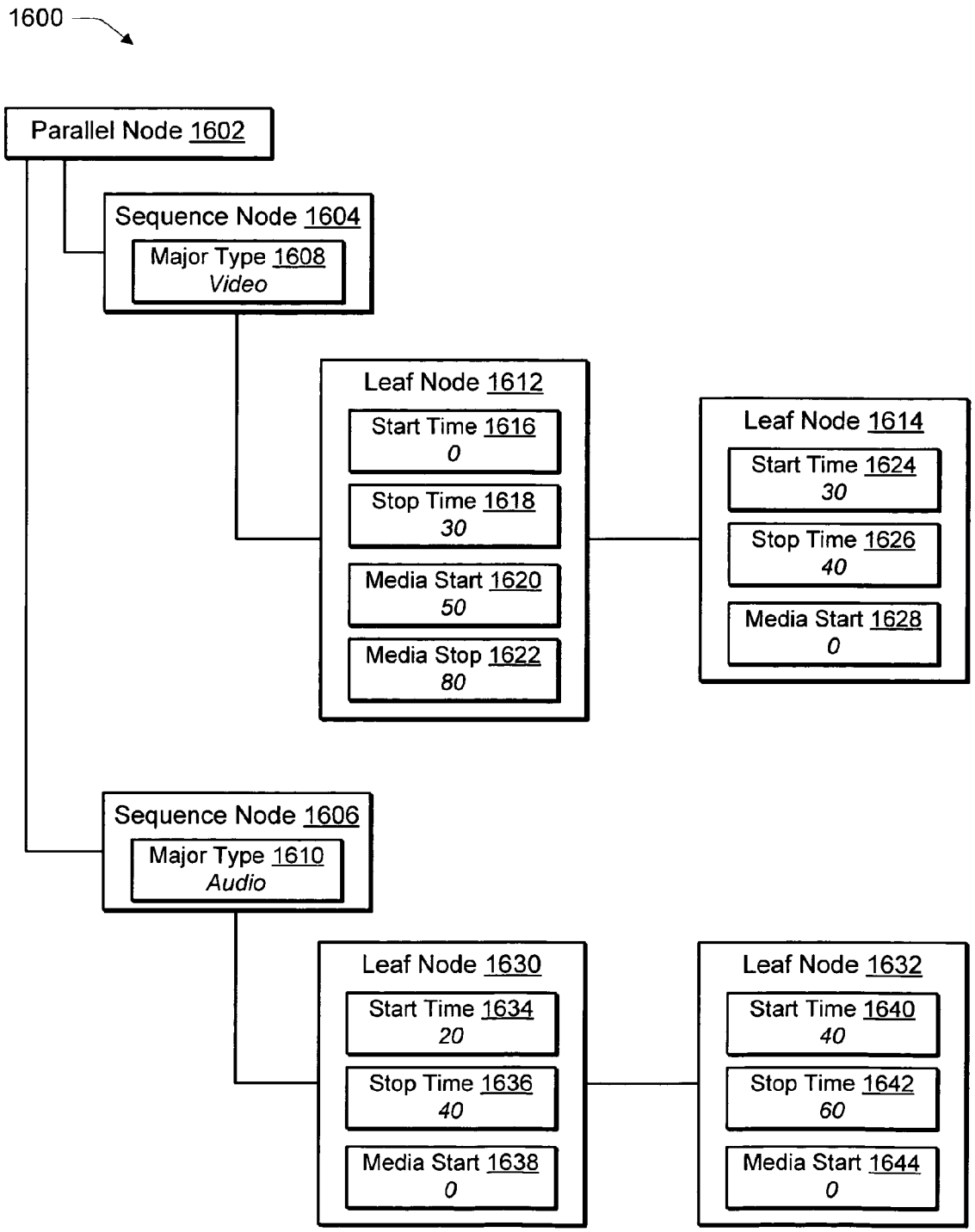
FIG. 16 is an illustration of an exemplary implementation showing a media timeline that includes a parallel node having two child sequence nodes that are described by an eXecutable Temporal Language (XTL) file.

The XTL file may be represented by the media timeline 1600 that is shown in FIG. 16 that includes a parallel node 1602 having two child sequence nodes 1604, 1606. In this example, sequence node 1604 has a major type 1608 filter set as "video" and sequence node 1606 has a major type 1610 filter set as "audio". Sequence node 1604 has two child leaf nodes 1612, 1614. Leaf node 1612 includes metadata that specifies a start time 1616 of "0", a stop time 1618 of "30", a media start 1620 of "50", and a media stop 1622 as "80". Leaf node 1614 include metadata that specifies a start time 1624 of "30", a stop time 1626 of "40", and media start 1628 as "0". It should be noted that leaf node 1614 does not include a media stop time, therefore the entire length of the media referenced by the leaf node 1614 will be output.

Sequence node 1606 also has two child leaf nodes 1630, 1632. Leaf node 1630 includes metadata that specifies a start time 1634 of "20", a stop time 1636 of "40", and a media start 1638 of "0". Leaf node 1632 include metadata that specifies a start time 1640 of "40", a stop time 1642 of "60", and media start 1644 of "0".

Figure 17:
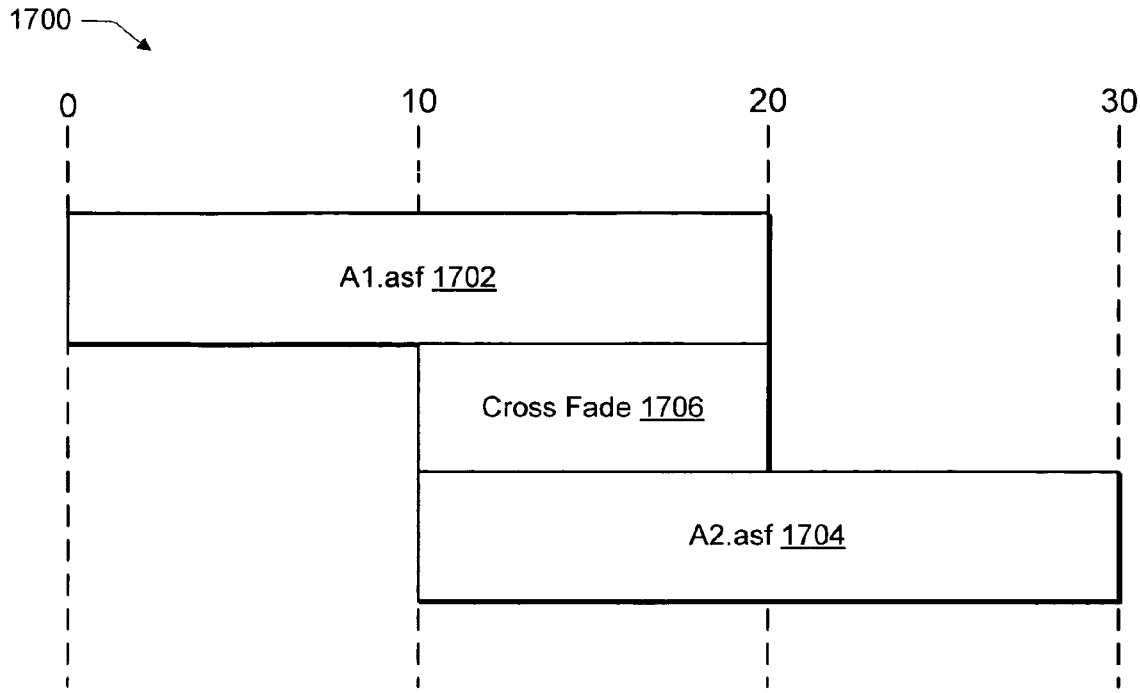
FIG. 17 is an illustration of an exemplary implementation showing an output of first and second media over particular time intervals and including an effect to transition between the first and second media.

FIG. 17 is an illustration of an exemplary implementation showing an output 1700 of first and second media over a specified time period that utilizes an effect to transition between the first and second media. In the illustrated example, A1.asf 1702 and A2.asf 1704 are two different audio files. A1.asf 1702 has an output length 20 seconds and A2.asf 1704 also has an output length 20 seconds. A cross fade 1706 effect is defined between the outputs of A1.asf 1702 and A2.asf 1704. In other words, the cross fade 1706 is defined to transition from the output of A1.asf 1702 to the output of A2.asf 1704. The cross fade 1706 effect is initiated at 10 seconds into the output of A1.asf 1702 and ends at the end of the output of A1.asf 1702. Therefore, the output of A2.asf 1704 is also initiated at 10 seconds. The cross fade 1706 is shown as inputting two different media, i.e. A1.asf 1702 and A2.asf 1704, and providing a single output having the desired effect.

Figure 18:
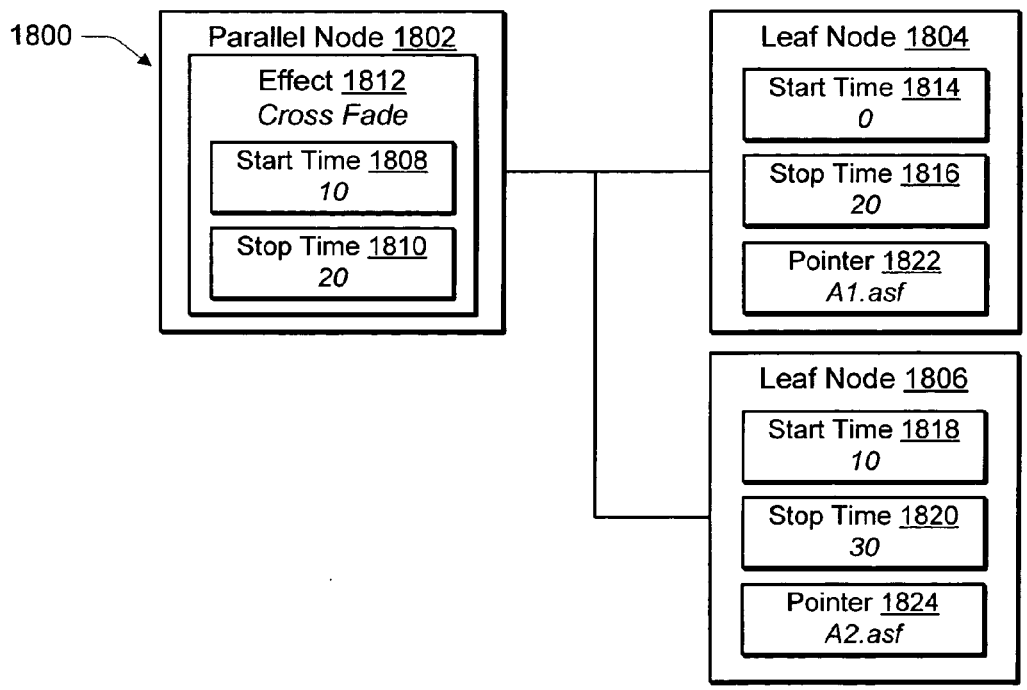
FIG. 18 is an illustration of a media timeline in an exemplary implementation that is suitable to implement the cross fade effect of FIG. 17.

FIG. 18 is an illustration of a media timeline 1800 in an exemplary implementation that is suitable to implement the cross fade 1706 effect of FIG. 17. The media timeline 1800 includes a parallel node 1802 having two children, i.e. leaf nodes 1804, 1806. The parallel node 1802 includes metadata that specifies a start time 1808 of zero seconds and a stop time 1810 of twenty seconds. The parallel node 1802 also includes a composite effect 1812 that describes a cross fade. The leaf node 1804 includes metadata indicating a start time 1814 of zero seconds and a stop time 1816 of twenty seconds. Leaf node 1806 includes metadata having a start time 1818 of ten seconds and a stop time 1820 of thirty seconds.

Leaf node 1804 also includes a pointer 1822 that references the A1.asf 1702 file described in relation of FIG. 17. Likewise, leaf node 1806 includes a pointer 1824 that references the A2.asf file 1704 that was described in relation to FIG. 17. Thus, when the media timeline 1800 is executed, the A1.asf 1702 file and the A2.asf file 1704 are output in a manner that employs the effect 1812 as shown in FIG. 17.

Timeline Sorting

The timeline sorter 126 may employ one or more timeline sorting algorithms to identify segments represented by a media timeline. Given a complex timeline, for instance, the timeline sorter 126 may "break" the media timeline into individual segments which may be independently rendered. For instance, the timeline sorter 126 may determine every point at which a timeline object (e.g., a node or effect) starts or stops, and from this determine a new segment for rendering. Thus, the timeline sorter 126 is representative of the functionality of the media foundation 204 that segments the media timeline 122. Illustrative examples of such a sorting process are shown in the following figures.

Figure 19:
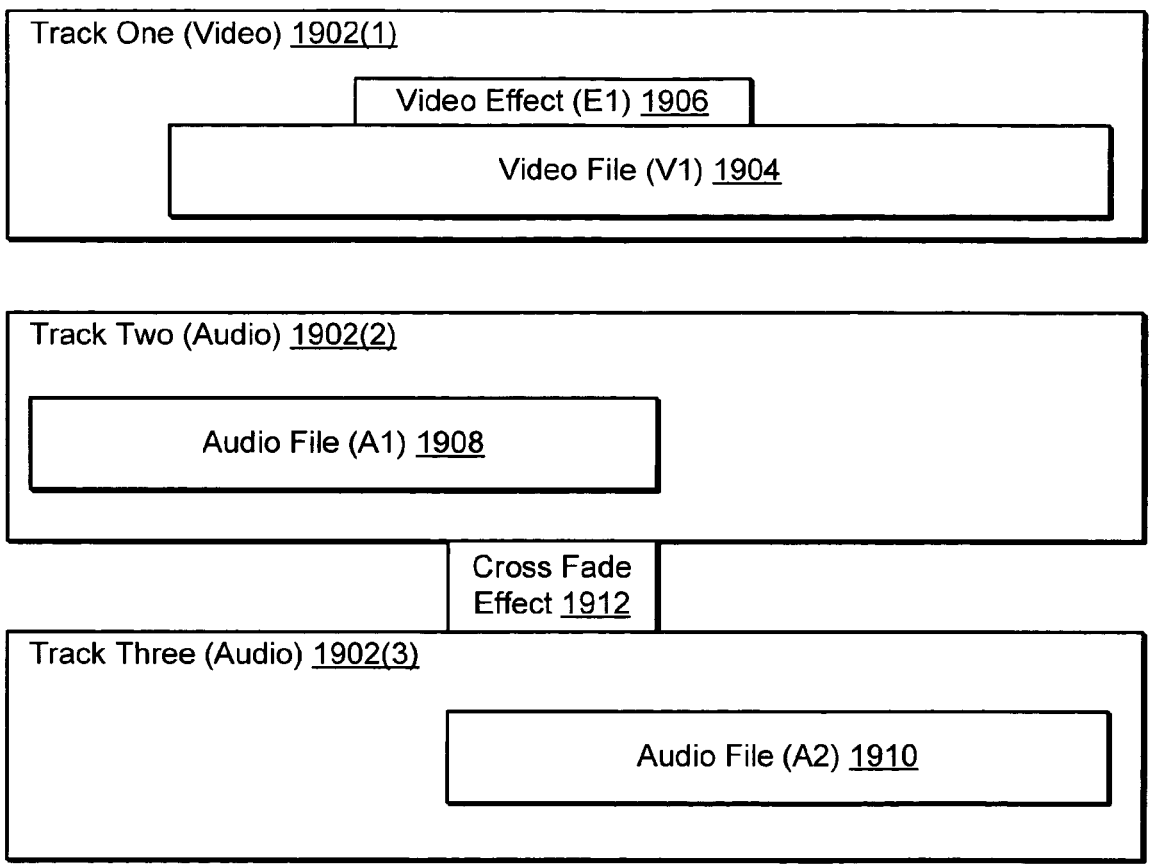
FIG. 19 is an illustration of a user interface view of an exemplary timeline for sorting.

FIG. 19 is an illustration of a user interface view of an exemplary timeline 1900 for sorting. The timeline of FIG. 19 is shown as it may appear in a user interface for editing. The timeline 1900 includes a plurality of tracks, which include track one 1902(1) for video, track two 1902(2) for audio, and track three 1902(3) for audio. Track one 1902(1) includes a video file 1904, to which, a video effect 1906 is to be applied. Track two 1902(2) includes an audio file 1908 and track three 1902(3) also includes an audio file 1910. A cross fade effect 1912 is illustrated as applied between the audio files 1908, 1910. In order to determine what segments are to be formed by the user interface view, "imaginary" lines may be drawn at the start and stop of each timeline object represented in the timeline 1900, an example of which is shown in the following figure.

Figure 20:
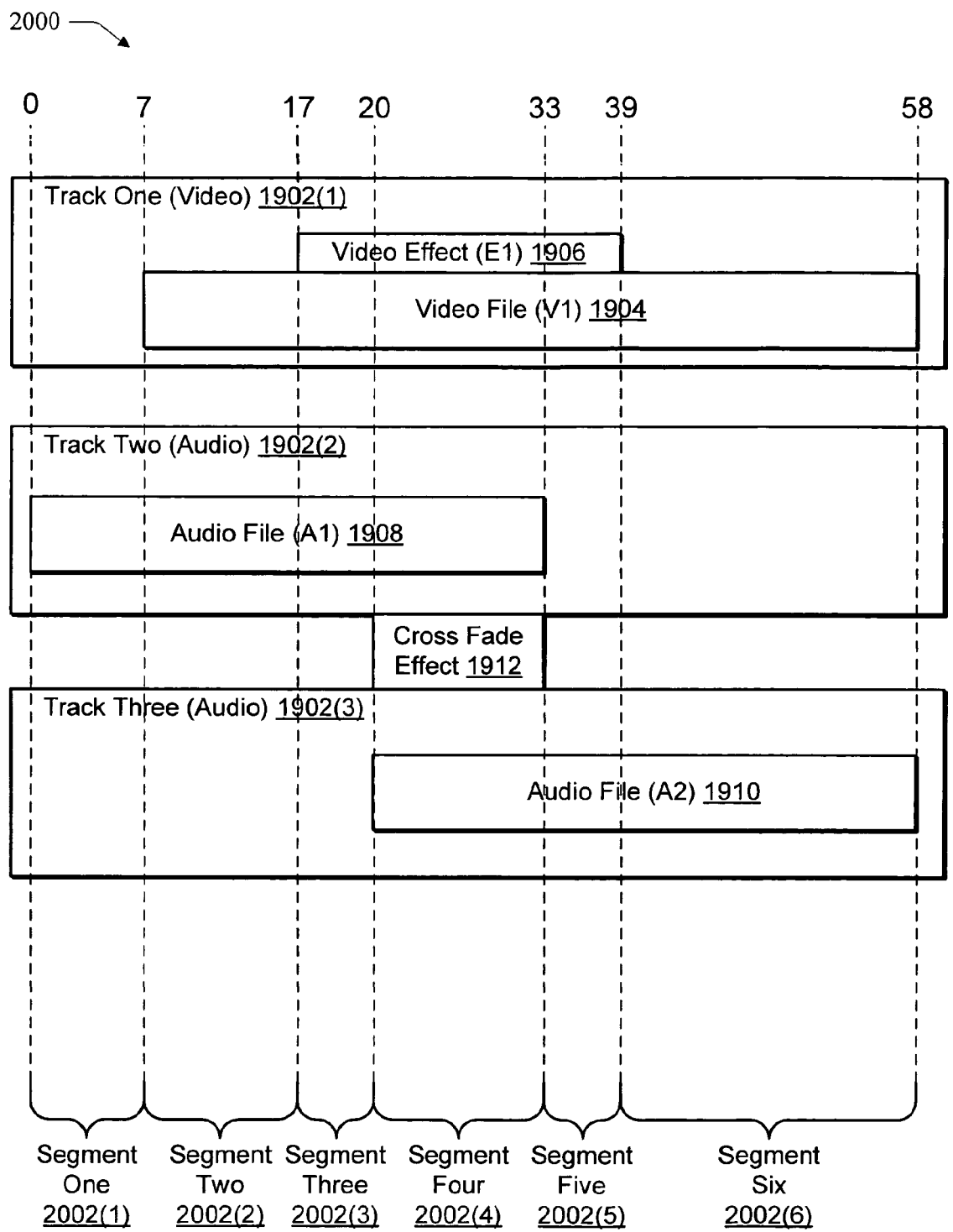
FIG. 20 is an illustration of another user interface view showing a segmented timeline which is formed by dividing the timeline of FIG. 19 into a plurality of segments by a timeline sorter.

FIG. 20 is an illustration of another user interface view showing a segmented timeline 2000 which is formed by dividing the timeline 1900 of FIG. 19 into a plurality of segments by a timeline sorter. The timeline 2000 includes a plurality of dashed lines, each of which illustrating a start or stop of a timeline object.

As illustrated, these dashed lines indicate a plurality of segments 2002(1)-2002(6). For example, segment 2002(1) begins with a start of audio file 1908 and stops with the start of video file 1904. Segment two 2002(2) begins with the start of video file 1904 and ends with the start of the video effect 1906. Segment three 2002(3) begins with the start of the video effect 1906 and ends with the start of the cross fade effect 1912. Segment four 2002(4) begins with the start of the cross fade effect 1912 and terminates with the end of the cross fade effect 1912. Segment five 2002(5) begins at the end of the cross fade effect 1912 and terminates at the end of the video effect 1906. The final segment, segment six 2002(6), terminates at the end of the audio file 1910 and the video file 1904. Thus, each pair of consecutive dashed lines of FIG. 20 defines a segment, in which, timeline objects rendered during that segment do not change.

Figure 21:
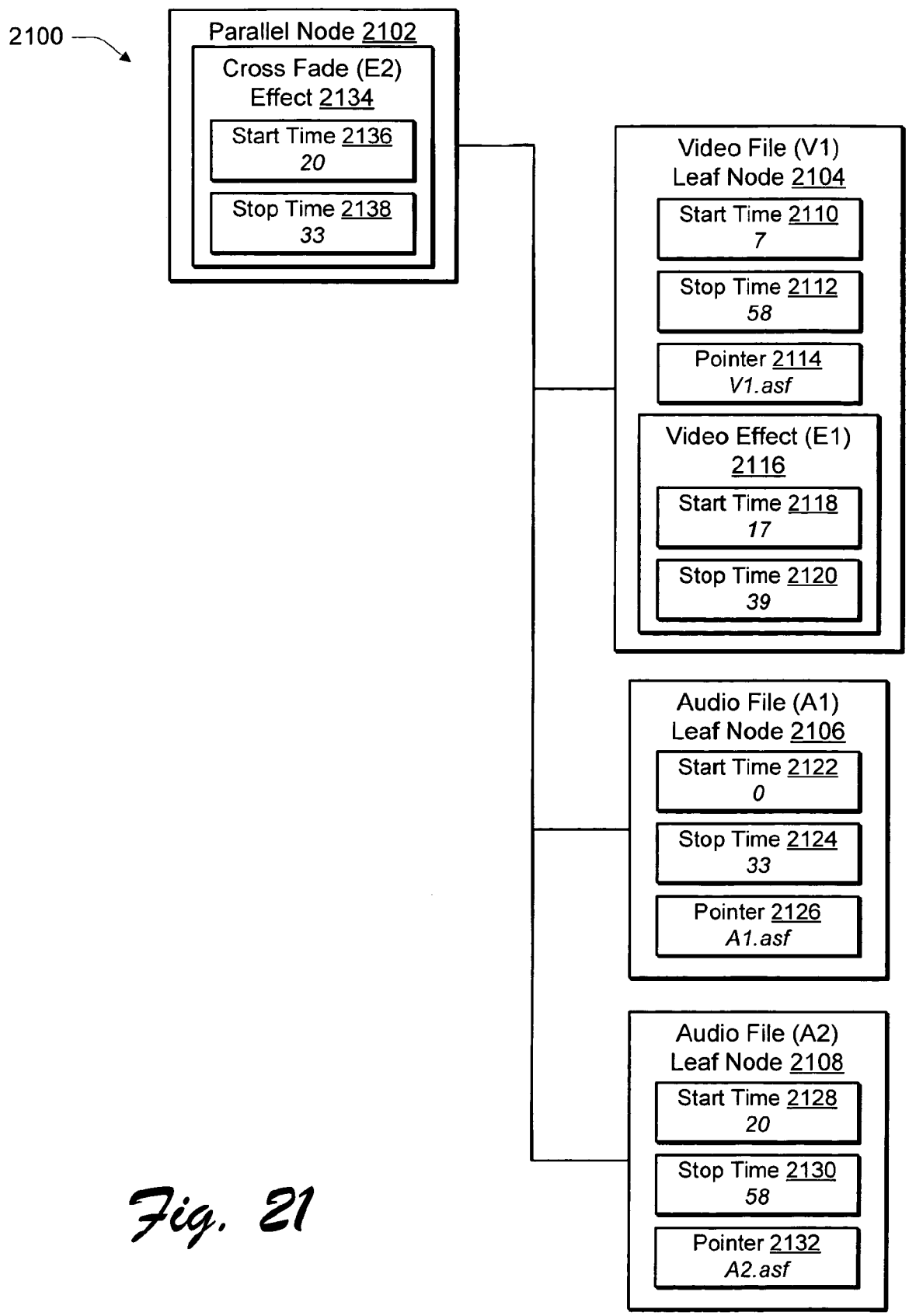
FIG. 21 is an illustration of an exemplary timeline represented using an object model which is configured to provide the timelines illustrated in FIGS. 19 and 20.

FIG. 21 is an illustration of an exemplary timeline 2100 represented using an object model which is configured to provide the timelines 1900, 2000 illustrated in FIGS. 19 and 20, respectively. The timeline 2100 includes a parallel node 2102 and three "child" leaf nodes, which are illustrated as video file leaf node 2104, an audio file leaf node 2106 and another audio file leaf node 2108.

Video file leaf node 2104 specifies a start time 2110 of "7" and a stop time 2112 of "58" for a video file (i.e., video file 1904) referenced by a pointer 2114. Video file leaf node 2104 also specifies a video effect 2116 having a start time 2118 of "17" and a stop time 2120 of "39".

Audio file leaf node 2106 specifies a start time 2122 of "0" and a stop time 2124 of "33" for an audio file (i.e., audio file 1908) referenced by pointer 2126. Audio file leaf node 2108 specifies a start time 2128 of "20" and a stop time 2130 of "58" for an audio file (i.e., audio file 1910) referenced by pointer 2132. The parallel node 2102 specifies a cross fade effect 2134 having a start time 2136 of "20" and a stop time 2138 of "33" to be applied to the audio file leaf nodes 2106, 2108. A variety of techniques may be utilized for sorting the timeline 2100, further discussion of which may be found in relation to the following figures.

Exemplary Procedures

The following discussion describes sorting techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment and systems of FIGS. 1-21.

Figure 22:
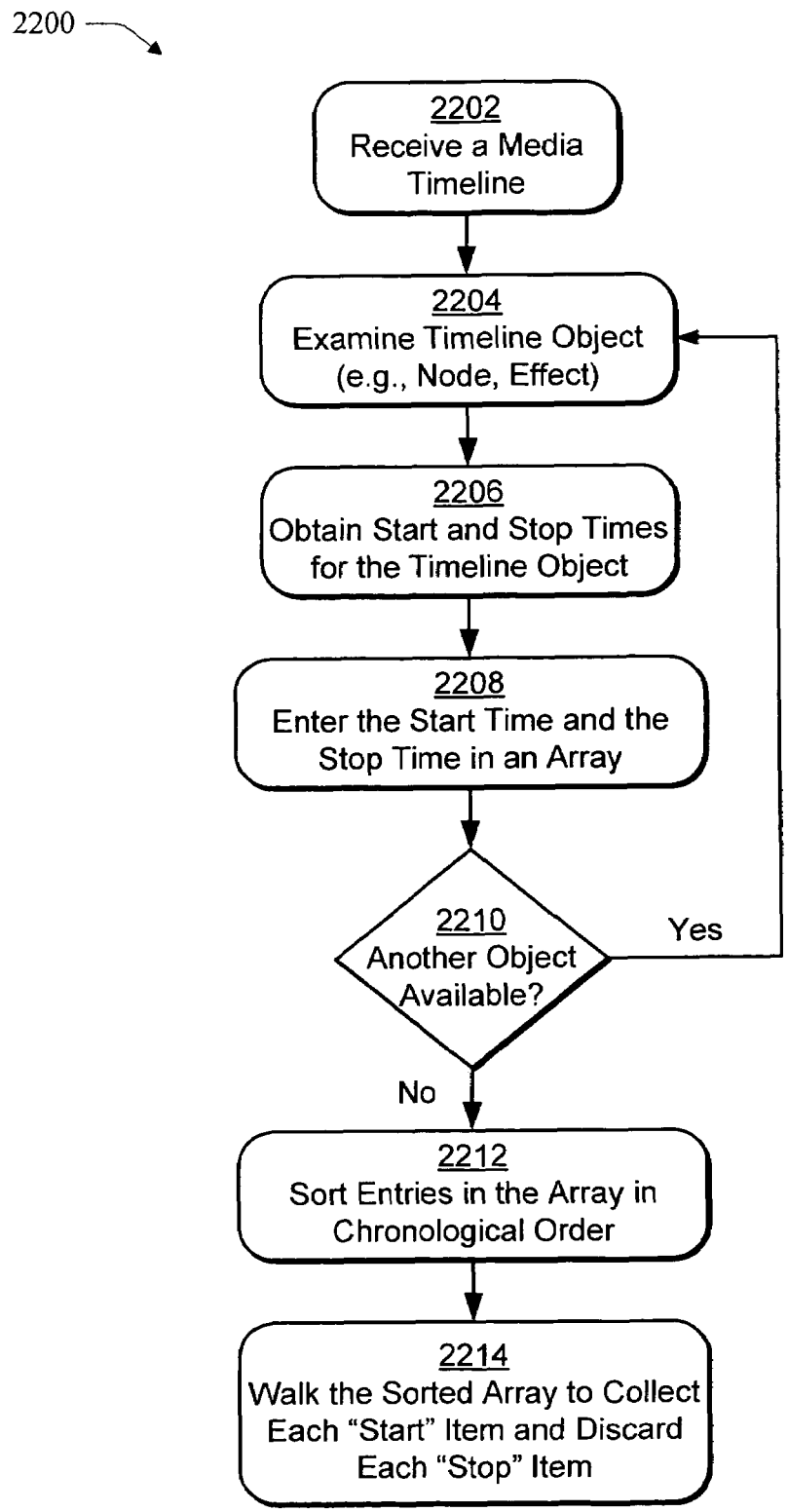
FIG. 22 is a flow diagram depicting a procedure in an exemplary implementation in which a media timeline is sorted into a plurality of segments for rendering by a timeline sorter.

FIG. 22 is a flow diagram depicting a procedure 2200 in an exemplary implementation in which a media timeline is sorted into a plurality of segments for rendering by a timeline sorter. A media timeline is received (block 2202). For example, the media timeline may be received from an application at application programming interface.

A timeline sorter is executed to examine timeline objects included in the media timeline (block 2204). For example, the timeline sorter may examine timeline objects for metadata which specifies a duration for performance of a task, such as nodes (e.g., leaf node, parallel nodes, sequence nodes) and effects, e.g., cross fade, and so on.

The timeline sorter gets a "start" time and a "stop" time for the timeline object (block 2206) as specified by the metadata. The timeline sorter then makes an entry for the start time and another entry for the stop time in an array (block 2208). A determination is then made is to whether another object is available (decision block 2210). If so ("yes" from decision block 2210), the other timeline object is examined (block 2204), the start and stop times are obtained (block 2206) and also entered into the array (block 2208).

Once each of the timeline objects have been processed ("no" from decision block 2210), the entries in the array are sorted into chronological order (block 2212). For example, the entries may be arranged in ascending order based on time. The sorted array is then "walked" to collect each "start" item and discard each "stop" item to arrive at the segments which makeup the time and which timeline objects are to be utilized during that segment.

Continuing with the previous example of FIGS. 18-21, for instance, in order to "figure out" the segments, the timeline sorter enters each node and effect of the timeline 2100 of FIG. 21 into an array. The array may be referred to as a "sorter element array". For each node and effect in the timeline 2100, two entries are made into the array. A first ends of the timeline object is for a "start" time of the object, and a second entry of the timeline object is for a "stop" time of the object. After "filling out" the sorter element array from the media timeline 2100, the array is sorted such that the elements are arranged in ascending order based on time.

Figure 23:
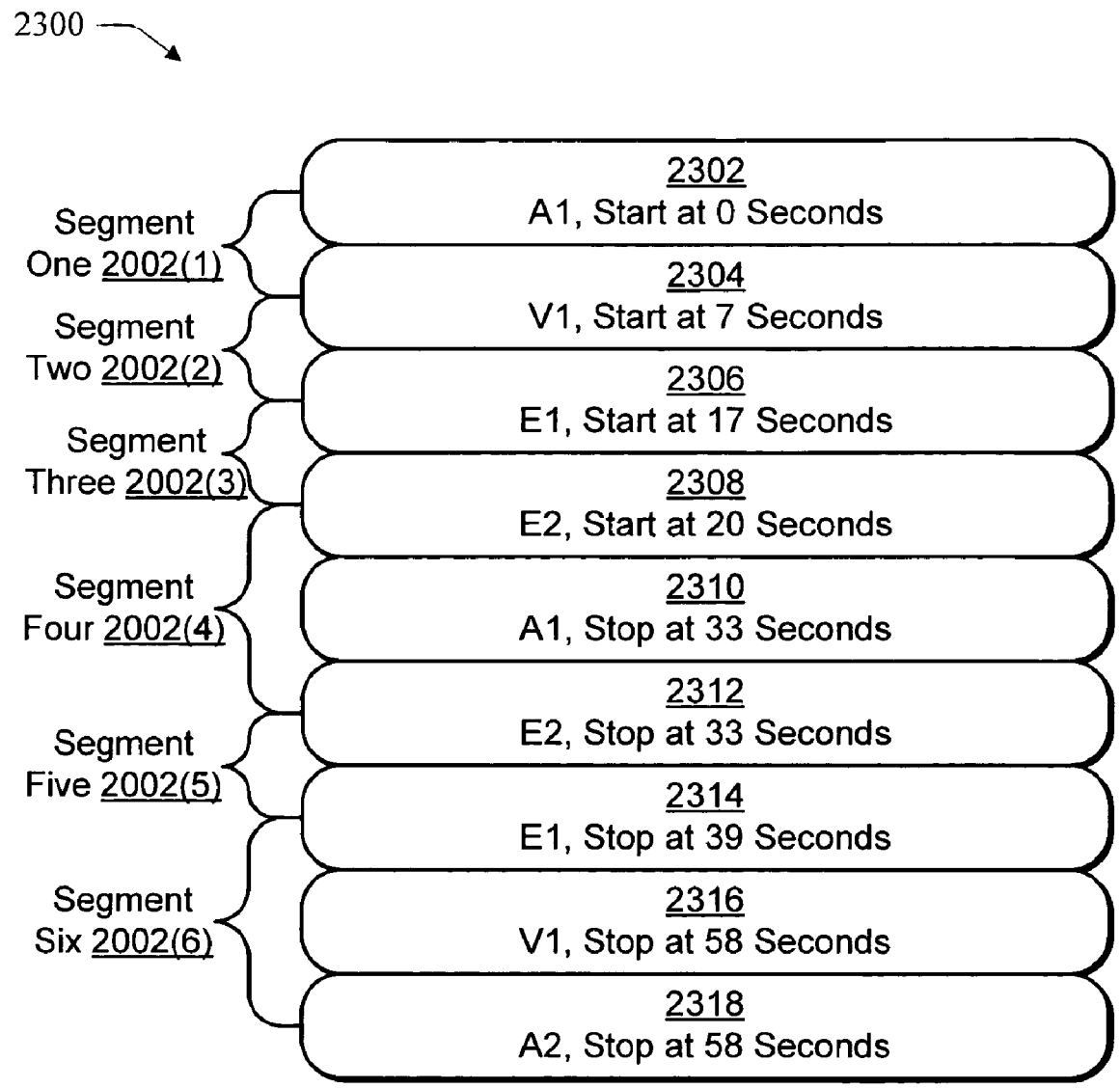
FIG. 23 is an illustration of an exemplary sorter element array formed from a timeline of FIG. 21 using the procedure of FIG. 22.

FIG. 23 is an illustration of an exemplary sorter element array 2300 formed from the timeline 2100 using the procedure 2200 of FIG. 22. The sorter element array 2300 has a plurality of elements 2302-2318, two for each of the leaf nodes and elements in the media timeline 2100 of FIG. 21. In order to get segments from the sorter element array 2300, the timeline sorter "walks" the array to find distinct time values, such as "0", "7", "17", "20", "33", "39" and "58" from the media timeline 2100. It should be noted that these values correspond to the values of the dashed lines of FIG. 20 which were utilized to illustrate the segments 2002(1)-2002(6). Thus, each segment is defined between the consecutive distinct values obtained in the array, which is illustrated in FIG. 23 by the brackets defining segment one 2002(1), segment two 2002(2), segment three 2002(3), segment four 2002(4), segment five 2002(5) and segment six 2002(6).

The time sorter walks the sorted array 2300 in chronological order and collects each item referenced by a "start" entry and discards each item that has a "stop" entry. For example, segment one 2002(1) is defined between "0" and "7" seconds. To determine which timeline objects are utilized during that segment, the timeline sorter notes entry 2302 for A1 (i.e., audio file 1908). The timeline sorter then examines a next entry 2304 and finds another "start" time, and stops the examination. Therefore, segment one 2002(1) includes just audio file 1908 playing for 7 seconds as determined by the timeline sorter.

Using a similar technique, the timeline sorter 126 may determine which timeline objects are utilized at any particular point in time of the media timeline 2100. For example, to determine which timeline objects are applicable to a segment six 2002(6) between 39 and 58 seconds, the timeline sorter module may traverse the array 2300 as follows:
 Audio File (A1) 1908, Start→[A1]
 Video File (V1) 1904, Start→[A1, V1]
 Video Effect (E1) 1906, Start→[A1, V1, E1]
 Audio File (A2) 1910, Start→[A1, V1, E1]
 Cross Fade Effect (E2) 1912, Start→[A1, V1, E1, A2, E2]
 Audio File (A1) 1908, Stop→[V1, E1, A2, E2]
 Cross Fade Effect (E2) 1912, Stop→[V1, E1, A2]
 Video Effect (E1) 1906, Stop→>[V1, A2]
 Video file (V1) 1904, Stop→[A2]
 Audio file (A2) 1910, Stop→[ ]

To traverse the array to locate which timeline objects are to be rendered at a particular time, the timeline sorter continues through the array until an element is reached having a time indication which is greater than the requested time. For instance, to determine which timeline objects are utilized at 32 seconds, the timeline sorter may continue until entry 2310 is reached, which has a corresponding indication of "33" seconds. Thus, elements 2310, 2312 are not utilized in the determination of which timeline objects are needed at "32" seconds. In this way, multiple timeline objects having the same time indication may be gathered for rendering.

The timeline sorter may also employ a variety of logic for representations of "special" cases in a timeline. For example, as previously described in relation to FIG. 7, the timeline object model may support a feature (e.g., loop count 726) in which the metadata for a node indicates how many times that node is "looped", i.e., the node is rendered. To describe such an instance, the timeline sorter may make multiple entries for that same node in the array, and adjust the time appropriately. In some instances, however, the media timeline may not include an indication of a "start" or "stop" time and therefore the timeline sorter applies additional functionality to sort the timeline, further discussion of which may be found in relation to the following figures.

Figure 24:
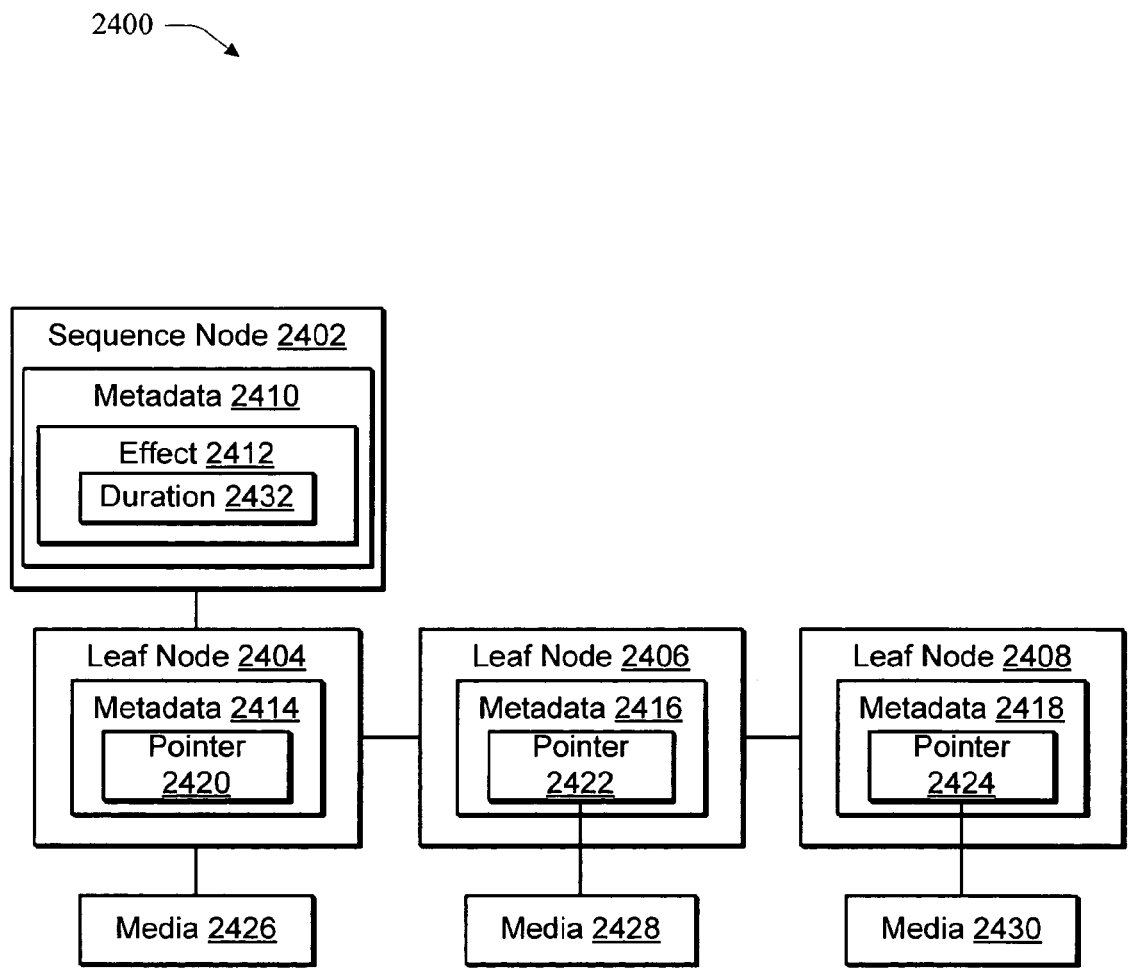
FIG. 24 is an illustration of a sequence node which is configured to provide a sequential playlist which does not have specified start and stop times.

FIG. 24 is an illustration of a sequence node which is configured to provide a sequential playlist which does not have specified start and stop times. In FIG. 24, a sequence node 2402 is shown that is similar to sequence nodes 402, 1102 that were described in relation to FIGS. 4 and 10, respectively. The sequence node 2402 has a plurality of leaf nodes 2404, 2406, 2408 that are children of the sequence node 2402. Each of the plurality of leaf nodes 2404-2408 includes respective metadata 2414-2418 having respective pointers 2420-2424 that reference respective media 2426-2430.

The sequence node 2402 is illustrated of a playlist that does not have start or stop times specified on the nodes. Rather, each of the plurality of leaf nodes 2404-2408 is rendered in succession, one after the other. Therefore, to sort these plurality of nodes 2404-2408, the timeline sorter 126 utilizes a construct for "infinite time" to indicate that the node is to be rendered until completion, after which the next node in sequence is rendered, further discussion of which may be found in relation to the following figure.

Figure 25:
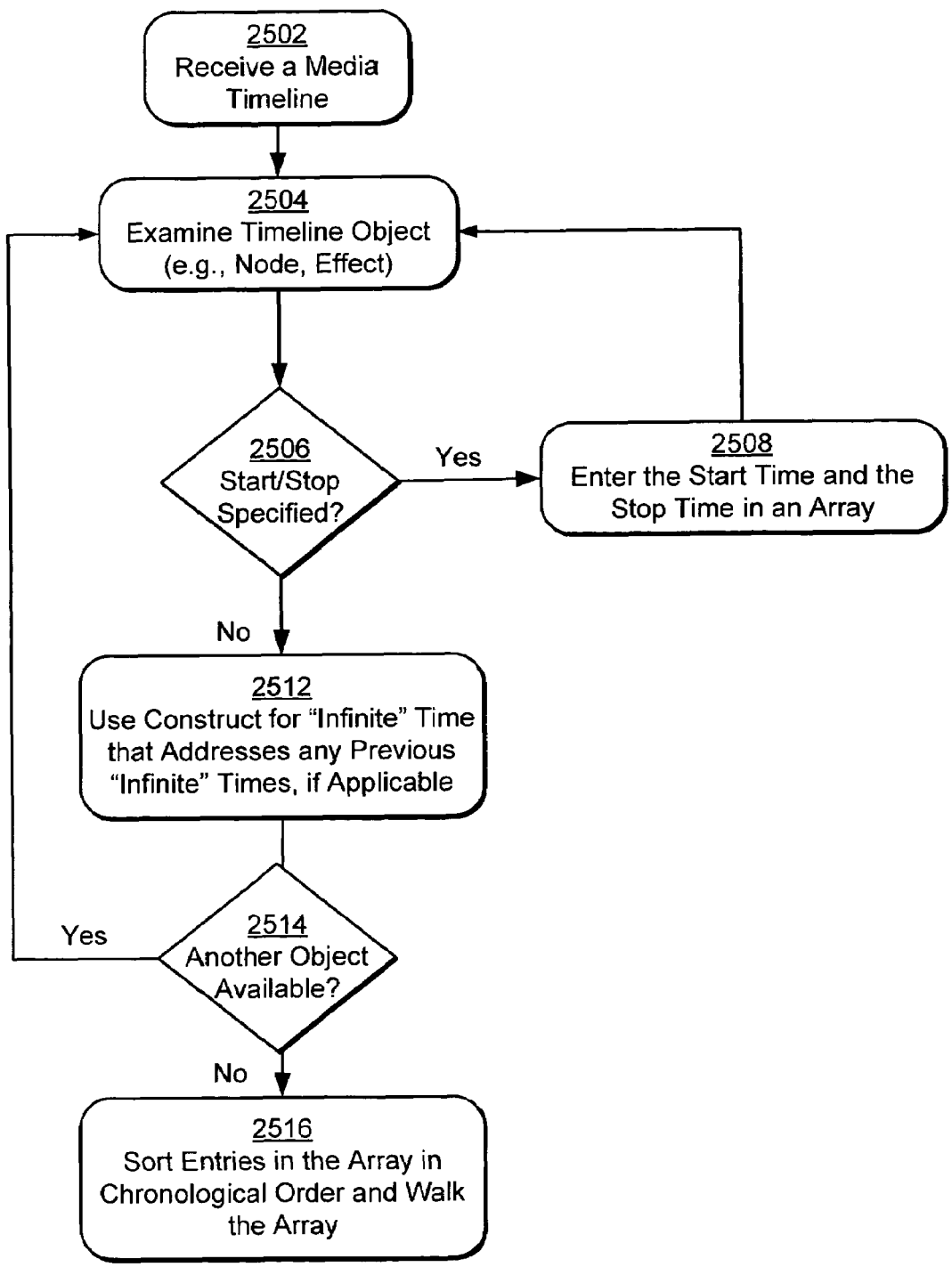
FIG. 25 is a flow diagram depicting a procedure in an exemplary implementation in which a media timeline is sorted which includes timeline objects which do not have start or stop time indications.

FIG. 25 is a flow diagram depicting a procedure 2500 in an exemplary implementation in which a media timeline which includes timeline objects which do not have start or stop time indications is sorted. A media timeline is received (block 2502) via an application programming interface.

The timeline sorter 126 then examines a timeline object (e.g., a node or effect) (block 2504) from the received media timeline. A determination is then made as to whether a start and stop time for the timeline object is specified (decision block 2506). If so ("yes" from decision block 2506), the start time and the stop time are entered into an array (block 2508). Thus, if the start and stop times are available, these times may be entered into the array as previously described in relation to FIG. 22.

If a start/stop time is not specified for the timeline object ("no" from decision block 2506), a construct for "infinite" time is used that addresses any previous "infinite" times, if applicable (block 2512). The construct may assume a variety of configurations, such as a single variable. For example, referring again to the media timeline 2400 of FIG. 2, the leaf node 2404 may be given a start time of "0" by the timeline sorter and a stop time of "x". Leaf node 2406 may be given a start time of "x" and a stop time of "2x" and leaf node 2408 may be given a start time of "2x" and a stop time of "3x". It should be noted that in this example, the value "x" does not necessarily represent the same amount of time between the leaf nodes 2404, 2406, 2408. For example, leaf node 2404 may have a duration that is different from leaf node 2406 and leaf node 2408. Thus, the variable in this instance represents that the corresponding leaf node is to be rendered until the rendering is completed. By specifying "infinite" times which indicate that the respective node is to be rendered until complete, the timeline sorter may sort the sequence node 2402 into an array as previously described through comparison of the leaf nodes 2404-2408, one to another.

Figure 26:
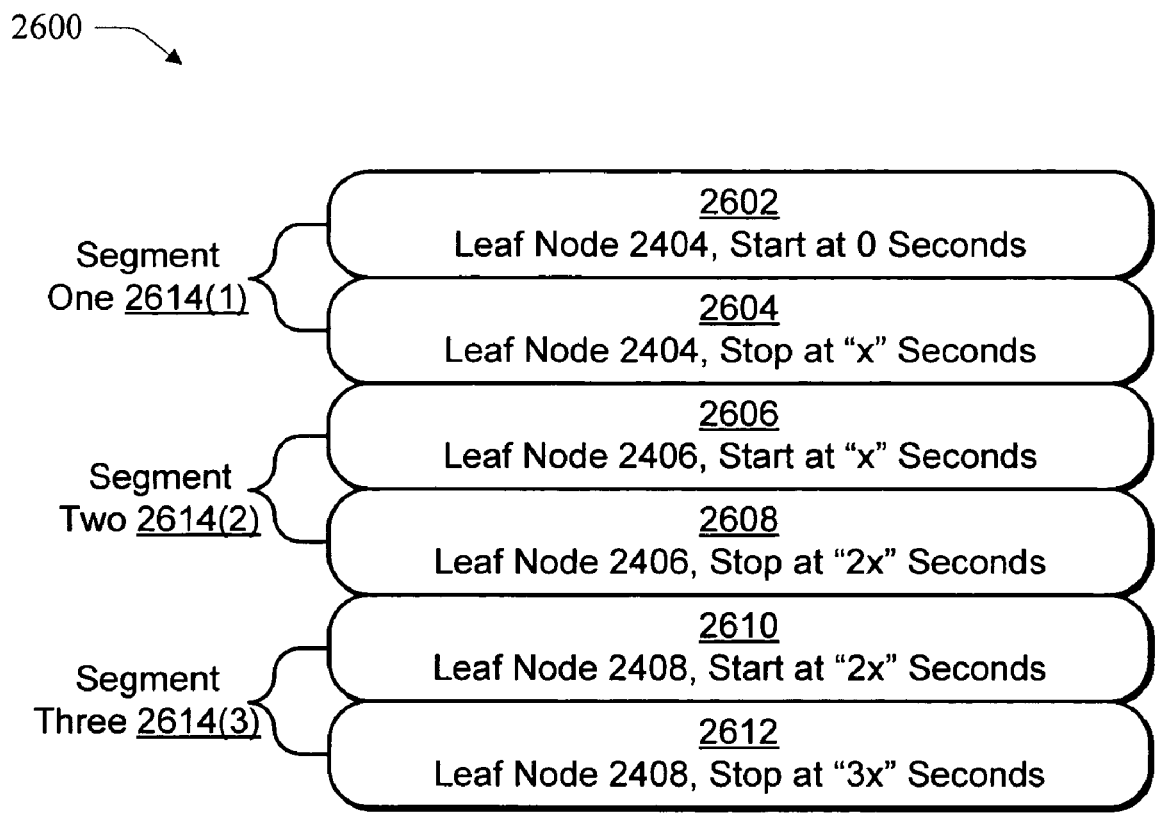
FIG. 26 is an illustration of an exemplary array formed from the media timeline of FIG. 24 as sorted by a timeline sorter.

FIG. 26 is an illustration of an exemplary array 2600 formed from the media timeline 2400 of FIG. 24 as sorted by a timeline sorter. The array 2600 includes a plurality of entries 2602-2612, two of which are formed for each of the leaf nodes 2404-2408 of FIG. 24. By using the construct of "infinite" time, the leaf nodes 2404-2408 which do not have specified start and stop times may still be sorted into a plurality of segments 2614(1)-2614(3) as previously described in relation to FIGS. 22 and 23.

In some instances, however, a start and stop time is determined for the nodes even if the start and stop time is not specified for the nodes. For example, returning again to FIG. 24, the sequence node 2402 include metadata 2410 that describes an effect 2412 that is to be employed between output of the media 2426-2430 referenced by the respective leaf nodes 2404-2408. Thus, the effect 2412 is applied to the media 2426-2430 originating from the children of the sequence node 2402.

The effect 2412 has a duration 2432. The duration 2432 may be used to specify an amount of overlap desired between the two or more nodes in a sequence. For example, the second input in the sequence, i.e. media 2426, may be output such that it overlaps for the duration 2432 of the effect 2412. Hence, an output duration of the sequence node 2402 becomes a function of the times specified on the leaf nodes 2404-2408 and the overlap specified by the duration 2432 of the effect 2412. However, because the leaf nodes 2404-2408 do not specify start and stop times in this example, the timeline sorter determines these start and stop times to determine when to apply the effect 2412.

For instance, the timeline sorter may first build a segment using a sorter array and then check to determine if the segment is valid or invalid, e.g., the segment contains more than one source with infinite duration, infinite-offset stop position, and so on. If the segment is invalid, the timeline sorter may calculate the duration and rebuild the array, an example of which is shown as follows:

$$0<1<2<\ldots <N<N+1<\text{infinite}-K-1<\text{infinite}-K<\text{infinite}-K+1<2\text{ infinite}-K-1<$$

In the above expression, for any number "N" the following holds true:

$$-N<\text{infinite}.$$

Also, for the above expression the following holds true for any number K:

$$-\text{infinite}-K-1<\text{infinite}-K;\text{ and}$$

$$-\text{infinite}+K<2\text{ infinite}$$

The timeline sorter, for instance, when constructing the array of FIG. 26, may encounter an effect (e.g., effect 2412) that is dependent on a start or stop time of another node for determining when to render the effect 2412. For example, effect 2412 may specify that the effect 2412 has a duration 2432 which is to be applied before the end of the rendering of leaf node 2404. Therefore, the timeline sorter may query the media sources of that leaf node 2404 to determine a start and stop time of the effect 2412, apply the start and stop times to the array, and then resort the timeline to determine if any changes were made to the segments, further discussion of which may be found in relation to the following figure. The timeline sorter may calculate duration for source nodes in the following cases: (1) when a segment includes more than one source with "infinite" (i.e., unspecified) duration; or (2) the segment includes source with time specified as an offset (e.g., "x-offset" for an effect). In the case where the segment includes one source with infinite duration, the timeline can play the file without calculating the duration.

Figure 27:
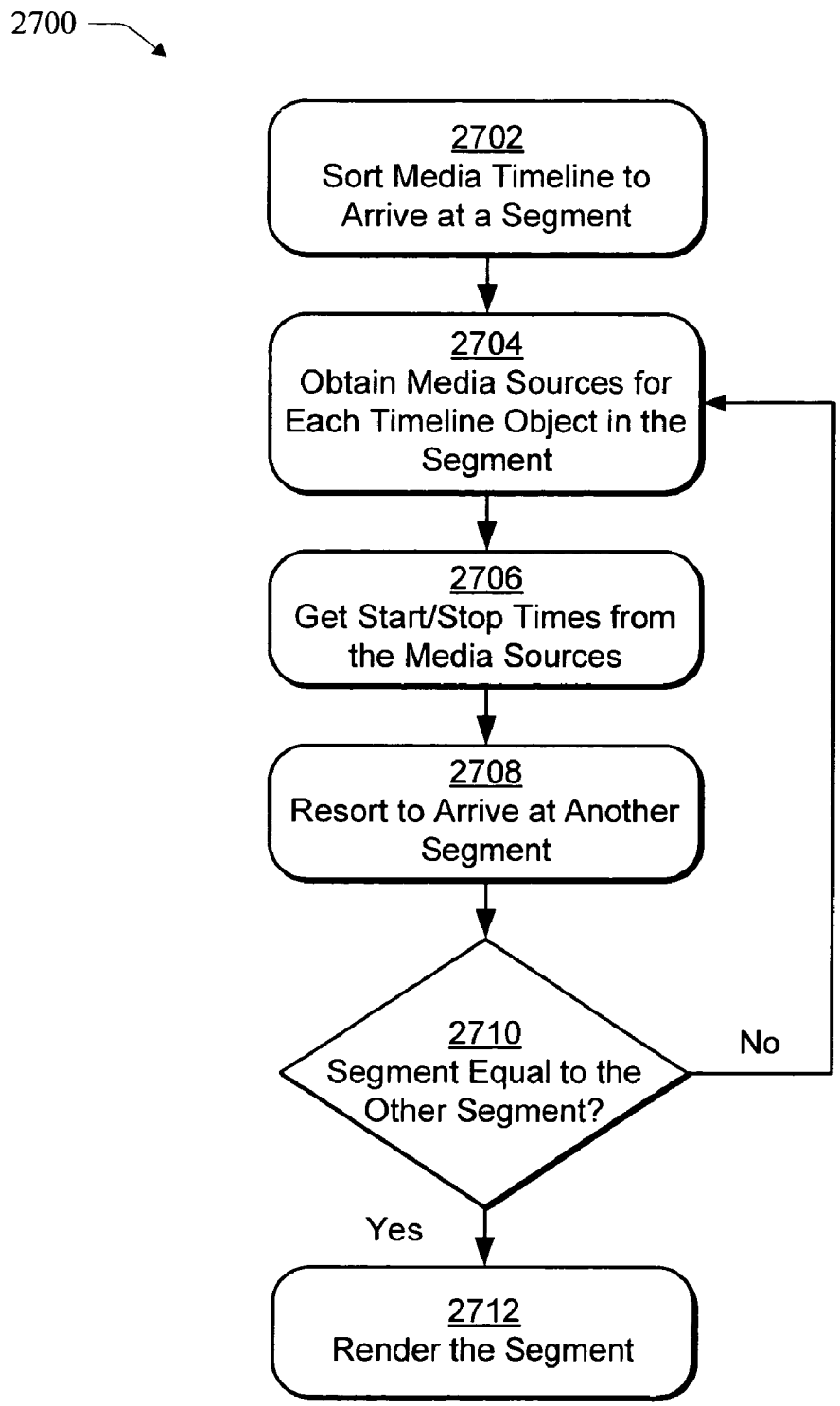
FIG. 27 is a flow diagram depicting a procedure in an exemplary implementation in which a timeline sorter obtains durations from media sources for timeline objects in an array which do not have durations specified in the respective metadata.

FIG. 27 is a flow diagram depicting a procedure 2700 in an exemplary implementation in which a timeline sorter determines start/stop times from media sources for timeline objects in an array which do not have start/stop times specified in the respective metadata. A media timeline is sorted to arrive at a segment (block 2702). For example, the media timeline may be sorted according to the procedure 2500 of FIG. 25 such that the media timeline includes a plurality of "infinite" time constructs.

The timeline sorter obtains the media sources for each timeline object specified in the segment (block 2704) and gets the start/top times from the media sources (block 2706). For example, the timeline sorter may determine relative start/stop times from a duration, metadata that describes a particular start/stop time, and so forth. The timeline sorter then resorts the entries to arrive at another segment (block 2708). The segment (of block 2702) is compared with the other segment (of block 2708) to determine if they are equal (decision block 2710), i.e., include the same timeline objects. If the segment are not equal ("no" from decision block 2712), a portion (blocks 2704-2712) of the procedure 2700 is repeated until the segments are equal. When the segments are equal ("yes" from block 2710), the segment is rendered 2712. In this way, changes and updates to the media timeline may be addressed, such as changes made to the media timeline which may affect how the media timeline is sorted. Further, this technique may address any updates made to the media timeline during rendering.

Exemplary Operating Environment

Figure 28:
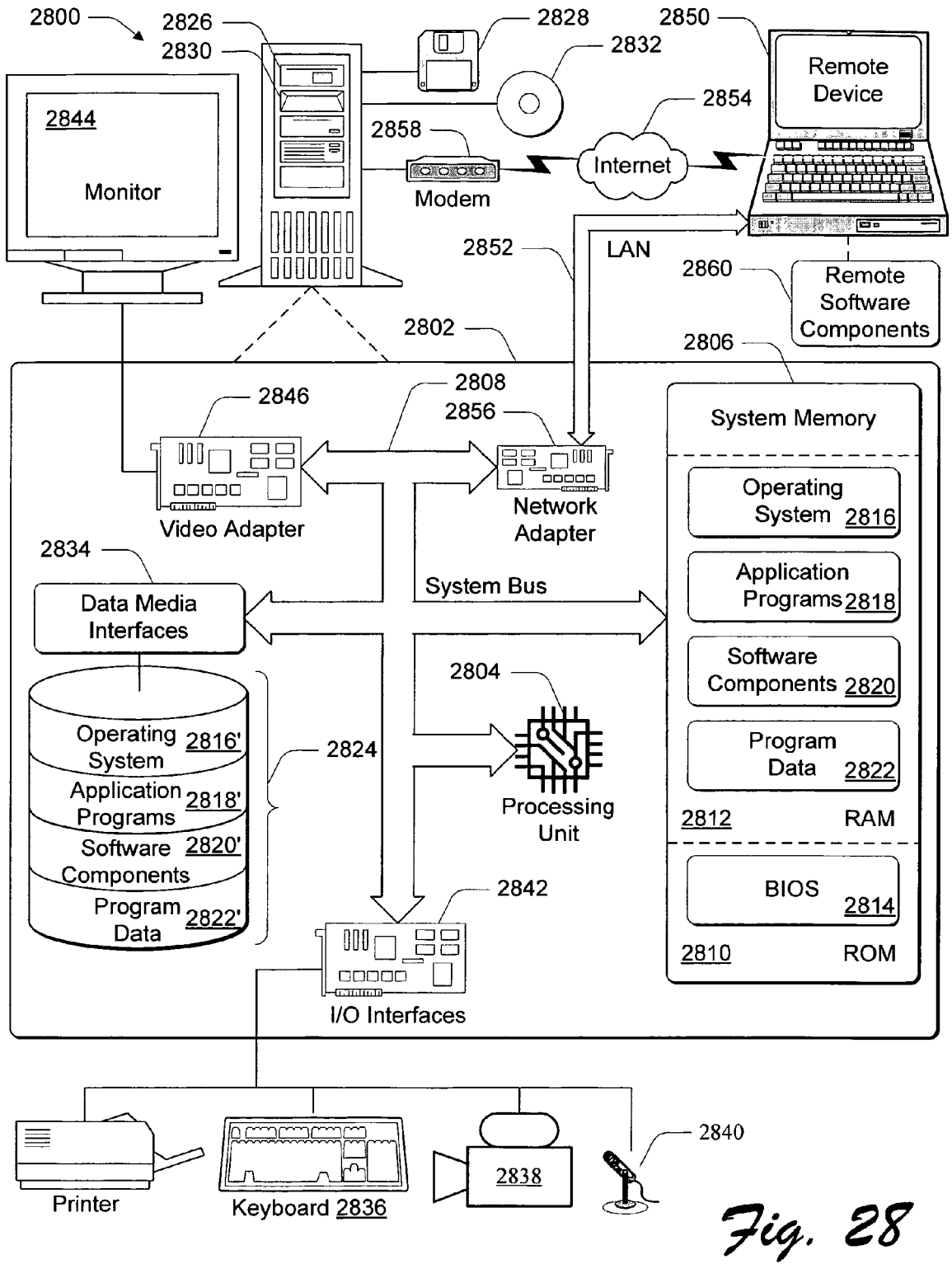
FIG. 28 is an illustration of an exemplary operating environment.

The various components and functionality described herein are implemented with a number of individual computers. FIG. 28 shows components of a typical example of a computer environment 2800, including a computer, referred by to reference numeral 2802. The computer 2802 may be the same as or different from computer 102 of FIG. 1. The components shown in FIG. 28 are only examples, and are not intended to suggest any limitation as to the scope of the functionality of the invention; the invention is not necessarily dependent on the features shown in FIG. 28.

Generally, various different general purpose or special purpose computing system configurations can be used. Examples of well known computing systems, environments, and/or configurations that may be suitable for use with the invention include, but are not limited to, personal computers, server computers, hand-held or laptop devices, multi-processor systems, microprocessor-based systems, set top boxes, programmable consumer electronics, network PCs, network-ready devices, minicomputers, mainframe computers, distributed computing environments that include any of the above systems or devices, and the like.

The functionality of the computers is embodied in many cases by computer-executable instructions, such as software components, that are executed by the computers. Generally, software components include routines, programs, objects, components, data structures, etc. that perform particular tasks or implement particular abstract data types. Tasks might also be performed by remote processing devices that are linked through a communications network. In a distributed computing environment, software components may be located in both local and remote computer storage media.

The instructions and/or software components are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 28, the components of computer 2802 may include, but are not limited to, a processing unit 2804, a system memory 2806, and a system bus 2808 that couples various system components including the system memory to the processing unit 2804. The system bus 2808 may be any of several types of bus structures including a memory bus or memory controller, a peripheral bus, and a local bus using any of a variety of bus architectures. By way of example, and not limitation; such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 2802 typically includes a variety of computer-readable media. Computer-readable media can be any available media that can be accessed by computer 2802 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 2802. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 2806 includes computer storage media in the form of volatile and/or nonvolatile memory such as read only memory (ROM) 2810 and random access memory (RAM) 2812. A basic input/output system 2814 (BIOS), containing the basic routines that help to transfer information between elements within computer 2802, such as during start-up, is typically stored in ROM 2810. RAM 2812 typically contains data and/or software components that are immediately accessible to and/or presently being operated on by processing unit 2804. By way of example, and not limitation, FIG. 28 illustrates operating system 2816, application programs 2818, software components 2820, and program data 2822.

The computer 2802 may also include other removable/non-removable, volatile/nonvolatile computer storage media. By way of example only, FIG. 28 illustrates a hard disk drive 2824 that reads from or writes to non-removable, nonvolatile magnetic media, a magnetic disk drive 2826 that reads from or writes to a removable, nonvolatile magnetic disk 2828, and an optical disk drive 2830 that reads from or writes to a removable, nonvolatile optical disk 2832 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2824 is typically connected to the system bus 2808 through a non-removable memory interface such as data media interface 2834, and magnetic disk drive 2826 and optical disk drive 2830 are typically connected to the system bus 2808 by a removable memory interface.

The drives and their associated computer storage media discussed above and illustrated in FIG. 28 provide storage of computer-readable instructions, data structures, software components, and other data for computer 2802. In FIG. 28, for example, hard disk drive 2824 is illustrated as storing operating system 2816', application programs 2818', software components 2820', and program data 2822'. Note that these components can either be the same as or different from operating system 2816, application programs 2818, software components 2820, and program data 2822. Operating system 2816', application programs 2818', software components 2820', and program data 2822 are given different numbers here to illustrate that, at a minimum, they are different copies. A user may enter commands and information into the computer 2802 through input devices such as a keyboard 2836, and pointing device (not shown), commonly referred to as a mouse, trackball, or touch pad. Other input devices may include source peripheral devices (such as a microphone 2838 or camera 2840 which provide streaming data), joystick, game pad, satellite dish, scanner, or the like. These and other input devices are often connected to the processing unit 2802 through an input/output (I/O) interface 2842 that is coupled to the system bus, but may be connected by other interface and bus structures, such as a parallel port, game port, or a universal serial bus (USB). A monitor 2844 or other type of display device is also connected to the system bus 2808 via an interface, such as a video adapter 2846. In addition to the monitor 2844, computers may also include other peripheral rendering devices (e.g., speakers) and one or more printers, which may be connected through the I/O interface 2842.

The computer may operate in a networked environment using logical connections to one or more remote computers, such as a remote device 2850. The remote device 2850 may be a personal computer, a network-ready device, a server, a router, a network PC, a peer device or other common network node, and typically includes many or all of the elements described above relative to computer 2802. The logical connections depicted in FIG. 28 include a local area network (LAN) 2852 and a wide area network (WAN) 2854. Although the WAN 2854 shown in FIG. 28 is the Internet, the WAN 2854 may also include other networks. Such networking environments are commonplace in offices, enterprise-wide computer networks, intranets, and the like.

When used in a LAN networking environment, the computer 2802 is connected to the LAN 2852 through a network interface or adapter 2856. When used in a WAN networking environment, the computer 2802 typically includes a modem 2858 or other means for establishing communications over the Internet 2854. The modern 2858, which may be internal or external, may be connected to the system bus 2808 via the I/O interface 2842, or other appropriate mechanism. In a networked environment, program modules depicted relative to the computer 2802, or portions thereof, may be stored in the remote device 2850. By way of example, and not limitation, FIG. 28 illustrates remote software components 2860 as residing on remote device 2850. It will be appreciated that the network connections shown are exemplary and other means of establishing a communications link between the computers may be used.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   receiving a media timeline at an application programming interface, wherein the media timeline includes a plurality of timeline objects, one or more said timeline objects referencing a respective one of a plurality of media; and
   generating a plurality of segments from the media timeline for rendering, one after another, wherein each said segment references a particular set of the timeline objects that are rendered during a duration of the segment, wherein the generating includes:
   examining metadata included in each said timeline object for a start time and a stop time of the node;
   adding an entry to an array for each said start time and an entry to the array for each said stop time;
   sorting each said entry in chronological order, one to another; and
   walking the sorted array to determine each said segment.

2. A method as described in claim 1, wherein at least one said timeline object specifies an effect to be applied to media referenced by another said timeline object.

3. A method as described in claim 1, wherein at least one said timeline object is configured for communication of events to another said timeline object such that a change may be made to the media timeline while the media timeline is rendered.

4. A method as described in claim 1, wherein at least one said timeline object references said media having a different format than said media referenced by another said timeline object.

5. A method as described in claim 1, wherein the generating includes
   determining that metadata included in at least one said timeline object does not specify a stop time; and
   adding an entry to an array which represents that the at least one said timeline object is to be rendered until completion.

6. A method as described in claim 5, wherein the generating includes
   determining that a start or stop time for a particular said timeline object is dependent on a start or stop time of the at least one said timeline object; and
   obtaining a media source which corresponds to the at least one said timeline object to ascertain the start or stop time of the at least one said timeline object.

7. A method as described in claim 6, wherein the generating includes:
   adding the ascertained start or stop time to the array; and
   resorting the array.

8. A method as described in claim 1, wherein the walking includes determining which of the plurality of timeline objects are included in a particular said segment by following the chronological order of the sorted array to a particular time defined by the particular said segment by:
   collecting each timeline object referenced by an entry having a start time; and
   discarding each timeline object referenced by an entry having a stop time.

9. A method as described in claim 1, further comprising:
   loading each said timeline object referenced by a first said segment; and
   while the first said segment is being rendered, loading each said timeline object referenced by a second said segment.

10. A method comprising:
    sorting a plurality of entries corresponding to a media timeline into chronological order in an array, wherein:
    each timeline object included in the media timeline has a corresponding said entry for a start time and a corresponding said entry for a stop time; and
    one or more said timeline objects reference media for rendering; and
    walking the sorted array to form a plurality of segments for rendering, wherein each said segment references one or more of the media which are to be rendered during the segment.

11. A method as described in claim 10, wherein at least one said timeline object specifies an effect to be applied to media referenced by another said timeline object.

12. A method as described in claim 10, wherein at least one said timeline object references said media having a different format than said media referenced by another said timeline object.

13. A method as described in claim 10, wherein the walking includes determining which of the plurality of timeline objects are included in a particular said segment by following the chronological order of the sorted array to a particular time defined by the particular said segment by:
    collecting each timeline object referenced by an entry having a start time; and
    discarding each timeline object referenced by an entry having a stop time.

14. A method comprising:
    receiving a request via an application programming interface to render a media timeline having a plurality of timeline objects at a particular point in time;
    walking a sorted array until a segment is reached which corresponds to the particular point in time by:
    collecting each said timeline object referenced by an entry in the sorted array having a start time; and
    discarding each said timeline object referenced by an entry in the sorted array having a stop time; and
    rendering the collected said timeline objects.

15. A method as described in claim 14, wherein at least one said entry in the sorted array having the stop time is obtained by examining metadata contained in a corresponding said timeline object of the media timeline.

16. A method as described in claim 14, wherein the stop time is obtained from at least one said entry by obtaining a media source referenced by a corresponding said timeline object.

17. A method as described in claim 14, wherein at least one said timeline object specifies an effect to be applied to media referenced by another said timeline object.

18. A method as described in claim 14, wherein at least one said timeline object references media having a different format than media referenced by another said timeline object.

19. A method as described in claim 14, further comprising:

loading each said timeline object referenced by a first said segment; and while the rendering of the first said segment is progressing, loading each said timeline object referenced by a second said segment.

* * * * *